US010843703B2

(12) United States Patent
Lin et al.

(10) Patent No.: US 10,843,703 B2
(45) Date of Patent: Nov. 24, 2020

(54) ACCURACY SYSTEM FOR CONNECTED VEHICLES

(71) Applicant: TOYOTA JIDOSHA KABUSHIKI KAISHA, Toyota (JP)

(72) Inventors: Chung-Wei Lin, Mountain View, CA (US); Shinichi Shiraishi, Mountain View, CA (US)

(*) Notice: Subject to any disclaimer, the term of this patent is extended or adjusted under 35 U.S.C. 154(b) by 312 days.

(21) Appl. No.: 15/885,805

(22) Filed: Jan. 31, 2018

(65) Prior Publication Data
US 2019/0232972 A1    Aug. 1, 2019

(51) Int. Cl.
*B60W 50/04* (2006.01)
*G01C 21/28* (2006.01)
*G01C 25/00* (2006.01)

(52) U.S. Cl.
CPC .......... *B60W 50/045* (2013.01); *G01C 21/28* (2013.01); *G01C 25/00* (2013.01); *B60W 2050/046* (2013.01)

(58) Field of Classification Search
CPC .......... B60W 50/045; B60W 2050/046; G01C 25/00; G01C 21/28
See application file for complete search history.

(56) References Cited

U.S. PATENT DOCUMENTS

| | | | |
|---|---|---|---|
| 9,238,467 B1* | 1/2016 | Hoye | B60W 50/14 |
| 10,249,193 B2* | 4/2019 | Altintas | B60W 30/08 |
| 2008/0189009 A1 | 8/2008 | Wang et al. | |
| 2014/0172226 A1* | 6/2014 | Goerick | B60W 50/0097 701/28 |

FOREIGN PATENT DOCUMENTS

| | | |
|---|---|---|
| JP | 2005050187 | 2/2005 |
| JP | 2008225786 | 9/2008 |
| JP | PO2010-237934 | 10/2010 |
| JP | 2016224867 | 12/2016 |
| JP | 2017167982 | 9/2017 |

OTHER PUBLICATIONS

JPO, Notice of Reasons for Rejection for Japanese Patent Application No. 2018-236011, dated Dec. 3, 2019, 2 pages.

\* cited by examiner

*Primary Examiner* — Elias Desta
(74) *Attorney, Agent, or Firm* — Burbage Law, P.C.; Jon-Michael Burbage; Elizabeth Ruzich

(57) ABSTRACT

An accuracy level for an ego vehicle is determined based on data provided by a first remote vehicle. The ego vehicle receives data describing information about the first remote vehicle that includes a sensor measurement. The ego vehicle determines that the data is inconsistent with local sensor data. The ego vehicle requests remote accuracy data from a set of remote vehicles, wherein the remote accuracy data describes an accuracy of the sensor measurement. The ego vehicle determines ego accuracy data for the first remote vehicle based on the remote accuracy data that is received from the set of remote vehicles, wherein the ego accuracy data describes an accuracy level for the first remote vehicle. The ego vehicle determines whether to input the data to the ADAS system based on the accuracy level.

20 Claims, 8 Drawing Sheets

DSRC DATA 195

- Vehicles and other client devices equipped with Direct Short Range Communication ("DSRC") transmit a Dedicated Short Range Communication Message ("DSRC message"). In some embodiments, the DSRC message is a Basic Safety Message ("BSM message") that is transmitted at a regular interval.

- Each DSRC message includes the following DSRC data describing one or more of the following for the vehicle that originally sent the DSRC message:
    (1) Location Data Describing the Location of the Vehicle, where the Location Data may be so accurate that it describes the specific lane the Vehicle is traveling in;
    (2) Heading Data Describing the Direction of travel for the Vehicle;
    (3) Velocity Data Describing the Velocity of the Vehicle; and
    (4) Path History of Vehicle (e.g., path history data).

Figure 4A

DSRC DATA 195

Part 1
Vehicle Position Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type

Figure 4B

ACCURACY SYSTEM FOR CONNECTED VEHICLES

BACKGROUND

The specification relates to an accuracy system for connected vehicles. Some embodiments described herein relate to an accuracy system for determining an accuracy of a sensor measurement recorded by one or more sensors of a connected vehicle.

Vehicle control systems are becoming increasingly popular. One example of a vehicle control system is an Advanced Driver Assistance System ("ADAS system" if singular, "ADAS systems" if plural).

Proper functioning of ADAS systems depends on the availability of highly accurate sensor data. The more accurate the sensor data, the more accurate the function of the ADAS system relative to the intent of the design engineer for the vehicle or the ADAS system. The less accurate the sensor data, the less accurate the function of the ADAS system relative to the intent of the design engineer. Accordingly, there is a need to provide ADAS systems with the most accurate sensor data available.

SUMMARY

Described are embodiments that include a system, method and a computer program product for determining an accuracy of a sensor measurement recorded by one or more sensors of a connected vehicle.

In some embodiments, there may be two sources of sensor data. The first source of sensor data is local sensors of the ego vehicle. Sensor data provided via this first source is referred to herein as "local sensor data." The second source of sensor data includes sensors of other vehicles that are remote from the ego vehicle. These remote vehicles may wirelessly transmit their sensor data to the ego vehicle via Dedicated Short Range Communication ("DSRC") or any other wireless communication method. Sensor data provided via this second source is referred to herein as "remote sensor data." The remote sensor data may be included in a DSRC message and thus referred to as DSRC data. See, e.g., FIGS. 4A and 4B. In some situations, the local sensor data is more accurate than the remote sensor data. In other situations, the remote sensor data may be more accurate than the local sensor data.

In some embodiments, the ego vehicle and one or more of the remote vehicles may be DSRC-equipped vehicles. A DSRC-equipped vehicle may include a vehicle that includes one or more of the following elements: a DSRC transceiver and any software or hardware necessary to encode and transmit a DSRC message; a DSRC receiver and any software or hardware necessary to receive and decode a DSRC message; and a DSRC-compliant Global Positioning System (a "DSRC-compliant GPS unit").

A DSRC-compliant GPS unit can provide vehicle position data describing the location of a vehicle with lane-level accuracy. Lane level accuracy may mean that the location of a vehicle is described so accurately that the vehicle's lane of travel may be accurately determined when traveling under an open sky (e.g., plus or minus 1.5 meters of the actual location of the vehicle). A conventional GPS system is unable to determine the location of a vehicle with lane-level accuracy. For example, a typical lane of a roadway is approximately 3 meters wide. However, a conventional GPS system may only have an accuracy of plus or minus 10 meters relative to the actual location of the vehicle.

A DSRC-compliant GPS unit may include hardware that wirelessly communicates with a GPS satellite to retrieve vehicle position data that describes a location of a vehicle with a precision that is compliant with the DSRC standard. The DSRC standard requires that vehicle position data be precise enough to infer if two vehicles are in the same lane. A DSRC-compliant GPS unit may be operable to identify, monitor and track its two-dimensional position within 1.5 meters of its actual position 68% of the time under an open sky. Since lanes of a roadway are typically no less than 3 meters wide, whenever the two-dimensional error of the vehicle position data is less than 1.5 meters the accuracy system described herein may analyze the vehicle position data provided by the DSRC-compliant GPS unit and determine what lane of the roadway the vehicle is traveling in based on the relative positions of vehicles on the roadway. In this way, the DSRC-compliant GPS unit may beneficially provide vehicle position data with lane-level accuracy, thereby enabling the accuracy system to provide an ADAS system of the ego vehicle with more accurate vehicle position data, thereby improving the functionality of the ADAS system.

In some embodiments, devices other than vehicles may be DSRC-equipped. These DSRC-equipped devices may be used to relay remote sensor data to the ego vehicle via a DSRC message. For example, a roadside unit ("RSU") or any other communication device may be DSRC-equipped if it includes one or more of the following elements: a DSRC transceiver and any software or hardware necessary to encode and transmit a DSRC message; and a DSRC receiver and any software or hardware necessary to receive and decode a DSRC message.

The embodiments described herein may use wirelessly transmit remote sensor data to the ego vehicle via a wireless message such as a DSRC message or a Basic Safety Message ("BSM"). The remote sensor data is included in DSRC data that is included in the DSRC message or BSM.

As some information is safety-critical and may have real-time deadlines, DSRC, together with its BSM requirements, provides the necessary efficiency and the underlying network protocols for the computation because it is designed for mobility and vehicular application. DSRC-enabled devices use the wildcard BSSID (a value of all "1"s) in the header of the frames they exchange, and may start sending and receiving data frames as soon as they arrive on the communication channel. This is one example reason why DSRC is suitable for vehicular applications whereas other types of wireless communication less suitable for vehicular application The ego vehicle may include a set of ADAS systems. The set of ADAS systems includes one or more ADAS systems.

In some embodiments, the ego vehicle that includes the accuracy system is an autonomous vehicle. The National Highway Traffic Safety Administration ("NHTSA") has defined different "levels" of autonomous vehicles, e.g., Level 0, Level 1, Level 2, Level 3, Level 4 and Level 5. If a vehicle has a higher-level number than another vehicle (e.g., Level 3 is a higher-level number than Levels 2 or 1), then the vehicle with a higher-level number offers a greater combination and quantity of autonomous features relative to the vehicle with the lower level number. The different levels of autonomous vehicles are described briefly below.

Level 0: The set of ADAS systems installed in the ego vehicle have no vehicle control, but may issue warnings to the driver of the ego vehicle. Vehicle control refers to the features or functionality provided by an ADAS system of the ego vehicle, including, e.g., an "autonomous feature" or an "autonomous functionality" provided by the ADAS system.

Level 1: The driver must be ready to take control of the ego vehicle at any time. The set of ADAS systems installed in the ego vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems installed in the ego vehicle fail to respond properly (based on the driver's subjective judgement). The set of ADAS systems installed in the vehicle executes accelerating, braking, and steering. The set of ADAS systems installed in the ego vehicle can deactivate immediately upon takeover by the driver.

Level 3: Within known, limited environments (such as freeways), the driver can safely turn their attention away from driving tasks, but must still be prepared to take control of the ego vehicle when needed.

Level 4: The set of ADAS systems installed in the ego vehicle can control the ego vehicle in all but a few environments such as severe weather. The driver must enable the automated system (which is comprised of the set of ADAS systems installed in the ego vehicle) only when it is safe to do so. When the automated system is enabled, driver attention is not required for the ego vehicle to operate safely and consistent with accepted norms.

Level 5: Other than setting the destination and starting the system, no human intervention is required. The automated system can drive to any location where it is legal to drive and make its own decision (which may vary based on the jurisdiction where the ego vehicle is located).

In some embodiments, the ego vehicle is a Highly Autonomous Vehicle ("HAV" if singular, or "HAVs" if plural). An HAV is a vehicle (e.g., the DSRC-enabled ego vehicle) that includes a set of ADAS systems that operate at Level 3 or higher as described above, or as defined by the NHTSA on page 9 of their policy paper entitled "Federal Automated Vehicles Policy: Accelerating the Next Revolution in Roadway Safety," which was published in September of 2016.

Examples of an ADAS system include one or more of the following: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system. Each of these example ADAS systems provide their own features and functionality that may be referred to herein as a "ADAS feature" or an "ADAS functionality," respectively. The features and functionality provided by these example ADAS systems are also referred to herein as an "autonomous feature" or an "autonomous functionality," respectively.

In some embodiments, the ego vehicle includes a DSRC radio. The DSRC radio includes the DSRC transceiver and the DSRC receiver. The DSRC radio receives a DSRC message that includes DSRC data. The DSRC data includes, among other things, sensor information which was measured by a first remote vehicle. The DSRC message is transmitted by first remote vehicle. The ego vehicle includes an onboard vehicle computer such as an electronic control unit ("ECU"). The onboard vehicle computer includes the accuracy system described herein. The accuracy system includes code and routines that are operable, when executed by the onboard vehicle computer, to cause the onboard vehicle computer to analyze all available information and provides real-time or near real-time computation of whether the sensor information included in the DSRC data is accurate. The sensor information may not be accurate, for example, if one or more sensors of the first remote vehicle are malfunctioning, damaged or in need of calibration, repair, replacement or a software update. If the sensor information is determined to be inaccurate, then the accuracy system causes the DSRC data to be deleted or disregarded.

In some embodiments, future instances of DSRC data from this particular first remote vehicle may be deleted or disregarded without need to determine whether it is accurate. For example, the first remote vehicle may be determined by the accuracy system to be untrustworthy and all wireless messages including a unique vehicle identifier for this particular first remote vehicle are deleted or disregarded by the ego vehicle.

In some embodiments, the information considered by the accuracy system when determining whether sensor information is accurate includes, for example, one or more of the following: (1) corresponding sensor information measured by the onboard sensor set of the ego vehicle which is known or thought to be reliable; (2) information received from other connected vehicles (i.e., second remote vehicles) that describes the accuracy of the sensor information generated by the first remote vehicle; and (3) the sensor information generated by the first remote vehicle (e.g., the DSRC data included in Part 1 of the DSRC message broadcast or transmitted by the first remote vehicle). Part 1 and Part 2 of an example DSRC message are depicted in FIG. 4B.

The accuracy system described herein overcomes numerous disadvantages of existing solutions. These disadvantages will now be described.

First, existing solutions always assume that the sensor information received from third-party connected vehicles (such as the first remote vehicle) is reliable. These existing solutions receive sensor information from third-party sources and automatically proceed to make operation decisions based on this sensor information. However, we know from experience that this sensor information is not always reliable since there will always be some vehicles whose sensors require maintenance, calibration or software updates such that the sensor information generated by these vehicles is inaccurate or inconsistent. The accuracy system described herein solves this problem by identifying unreliable vehicles and excluding sensor information received from these unreliable vehicles. When a wireless message including sensor information is received by the ego vehicle that includes the accuracy system, the accuracy system operates in real-time (or near real-time) to analyze relevant available data to determine an accuracy of the sensor information received from the third-party vehicle, and optionally a "trust level" for the third-party vehicle itself. This analysis occurs before the sensor information is used by the ADAS systems of the ego vehicle to make operation decisions for the ego vehicle. As a result, the accuracy system beneficially improves the quality of the operation decisions of connected vehicles by excluding sensor information which is received from an unreliable source. By comparison, existing solutions would not exclude the sensor information which is received from an unreliable source, and are therefore likely to make bad vehicle operation decisions relative to those made by vehicles that include the accuracy system described herein. The improved decision making enabled by the accuracy will increase vehicle safety and may save lives.

Second, in some embodiments the accuracy system described herein detects a broken or inaccurate sensor for a third-party vehicle and assists that third-party vehicle to seek out a repair. For example, the accuracy system detects vehicles whose sensor information is inaccurate or inconsistent in the manner described above. These vehicles are referred to as "unreliable vehicles." In some embodiments, the accuracy system includes functionality that causes the ego vehicle to send a wireless message to unreliable vehicles which notifies them that their sensors appear to need maintenance, calibration or a software updates. The unreliable vehicle may then take steps to notify their driver that they require servicing.

Alternatively, the accuracy system can also send the wireless message identifying the unreliable vehicle to a server of a manufacturer of the unreliable vehicle as well as the data used by the accuracy system to designate the vehicle as being unreliable. The server can then analyze the underlying data to verify whether the vehicle is "unreliable." If the determination that the vehicle is "unreliable" is verified by the server, the manufacturer can then take action by either sending a message to the driver (e.g., via email, SMS, or some other convenient means) or causing the vehicle itself to display a message for the driver that encourages the driver to take their vehicle in for maintenance. If the determination that the vehicle is "unreliable" is not verified by the server, then the server can then take action by aggregating data that helps generate a software update for the accuracy system that improves its operation and functionality.

Third, the accuracy system may improve the security of other vehicles by detecting malicious attacks which may be causing the other vehicles to be recording inaccurate sensor measurements. For example, an unreliable vehicle may be generating inaccurate or inconsistent sensor information due to being hacked by a malicious individual or computer program. As described above, the accuracy system can (1) detect vehicles whose sensor information is inaccurate or inconsistent and (2) send a wireless message to the unreliable vehicle notifying them of the problem. These vehicles will eventually be taken to a dealership or mechanic for servicing, where the hacking problem will be discovered.

Alternatively, the accuracy system can also send the wireless message identifying the unreliable vehicle to a server of a manufacturer of the unreliable vehicle as well as the data used by the accuracy system to designate the vehicle as being unreliable. The server can analyze the underlying data. The server can also retrieve other diagnostic data from the third-party vehicle itself. In this way the server can attempt to verify whether the third-party vehicle is hacked. If the third-party vehicle is hacked, then the server can take urgent action such as transmitting wireless messages to the third-party vehicles which causes the ADAS systems of the third-party vehicle to safely drive to a breakdown lane (or some other location which is known to be safe and legal) and cease operation. The server can take additional action to notify the driver of the problem and take other actions to assist the driver. In some embodiments, the server is a cloud server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for an ego vehicle including an ADAS system, the method including: receiving DSRC data describing information about a first remote vehicle, where the DSRC data includes a sensor measurement recorded by the first remote vehicle; determining that the DSRC data is inconsistent with local sensor data measured by one or more sensors of the ego vehicle; requesting remote accuracy data from a set of remote vehicles, where the remote accuracy data describes an accuracy of the sensor measurement of the first remote vehicle as determined by the set of remote vehicles; determining ego accuracy data for the first remote vehicle based on the remote accuracy data that is received from the set of remote vehicles, where the ego accuracy data describes an accuracy level for the first remote vehicle as determined by the ego vehicle; and determining whether to input the DSRC data to the ADAS system based on the accuracy level described by the ego accuracy data so that inaccurate information is not inputted to the ADAS system and a performance of the ADAS system is improved. Other embodiments of this aspect include corresponding computer systems, apparatus, and computer programs recorded on one or more computer storage devices, each configured to perform the actions of the methods. In some embodiments, the ego accuracy data indicates whether particular sensor measurements (e.g., location, speed, heading, etc.) included in the DSRC data are accurate.

Implementations may include one or more of the following features. The method where the DSRC data is received via a broadcasted message. The method where the DSRC data is included in a message received via channel 172 of a DSRC spectrum. The method where the DSRC data describes one or more of the following: a location of the first remote vehicle at a particular time; a velocity of the remote vehicle at the particular time; and a heading of the remote vehicle at the particular time. The method where requesting the remote accuracy data includes broadcasting a message that includes a request for the remote accuracy data from one or more second remote vehicles that are included in the set of remote vehicles. The method where one or more of the DSRC data and the remote accuracy data are received in a wireless message that is provided by an RSU. The method further including comparing the ego accuracy data to a threshold value to determine whether the threshold is satisfied, where determining whether to input the DSRC data to the ADAS system includes inputting the DSRC data to the ADAS system when the threshold is satisfied and not inputting the DSRC data to the ADAS system when the threshold is not satisfied. The method where the ego vehicle is a highly autonomous vehicle. Implementations of the described techniques may include hardware, a method or process, or computer software on a computer-accessible medium.

One general aspect includes a system including an ego vehicle, the ego vehicle including: an ADAS system; and an onboard vehicle computer system that is communicatively coupled to the ADAS system, the onboard vehicle computer system including a non-transitory memory storing computer code which, when executed by the onboard vehicle computer system causes the onboard vehicle computer system to: receive DSRC data describing information about a first remote vehicle, where the DSRC data includes a sensor measurement recorded by the first remote vehicle; determine that the DSRC data is inconsistent with local sensor data;

request remote accuracy data from a set of remote vehicles, where the remote accuracy data describes an accuracy of the sensor measurement of the first remote vehicle.; determine ego accuracy data for the first remote vehicle based on the remote accuracy data that is received from the set of remote vehicles, where the ego accuracy data describes an accuracy level for the first remote vehicle; and determine whether to input the DSRC data to the ADAS system based on the accuracy level described by the ego accuracy data so that inaccurate information is not inputted to the ADAS system. Other embodiments of this aspect include corresponding computer systems, apparatus, and computer programs recorded on one or more computer storage devices, each configured to perform the actions of the methods.

Implementations may include one or more of the following features. The system where the DSRC data is included in a DSRC message and the ego accuracy data describes the accuracy of a part 1 of the DSRC data. The system where the DSRC data describes one or more of the following: a location of the first remote vehicle at a particular time; a velocity of the remote vehicle at the particular time; and a heading of the remote vehicle at the particular time. The system where requesting the remote accuracy data includes broadcasting a message that includes a request for the remote accuracy data from one or more second remote vehicles that are included in the set of remote vehicles. The system where one or more of the DSRC data and the remote accuracy data are received in a wireless message that is provided by a RSU. The system where the local sensor data describes one or more of the following as measured by a sensor set of the ego vehicle that is communicatively coupled to the onboard vehicle computer system: a location of the first remote vehicle at a particular time; a velocity of the remote vehicle at the particular time; and a heading of the remote vehicle at the particular time. The system where the non-transitory memory stores additional computer code that, when executed by the onboard vehicle computer system, causes the onboard vehicle computer system to compare the ego accuracy data to a threshold value to determine whether the threshold is satisfied, where determining whether to input the DSRC data to the ADAS system includes inputting the DSRC data to the ADAS system when the threshold is satisfied and not inputting the DSRC data to the ADAS system when the threshold is not satisfied. The system where the ego vehicle is an autonomous vehicle. Implementations of the described techniques may include hardware, a method or process, or computer software on a computer-accessible medium.

One general aspect includes a computer program product including a non-transitory memory of an onboard vehicle computer system of an ego vehicle storing computer-executable code that, when executed by a processor, causes the processor to: receive DSRC data describing information about a first remote vehicle, where the DSRC data includes a sensor measurement recorded by the first remote vehicle; determine that the DSRC data is inconsistent with local sensor data; request remote accuracy data from a set of remote vehicles, where the remote accuracy data describes an accuracy of the sensor measurement of the first remote vehicle; determine ego accuracy data for the first remote vehicle based on the remote accuracy data that is received from the set of remote vehicles, where the ego accuracy data describes an accuracy level for the first remote vehicle; and determine whether to input the DSRC data to an ADAS system based on the accuracy level described by the ego accuracy data so that inaccurate information is not inputted to the ADAS system. Other embodiments of this aspect include corresponding computer systems, apparatus, and computer programs recorded on one or more computer storage devices, each configured to perform the actions of the methods.

Implementations may include one or more of the following features. The computer program product where the DSRC data is included in a DSRC message and the ego accuracy data describes the accuracy of a part 1 of the DSRC data. The computer program product where requesting the remote accuracy data includes broadcasting a message that includes a request for the remote accuracy data from one or more second remote vehicles that are included in the set of remote vehicles. The computer program product where one or more of the ego vehicle and the first remote vehicle is an autonomous vehicle. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 4A is a block diagram illustrating an example of DSRC data according to some embodiments.

FIG. 4B is a block diagram illustrating an example of DSRC data according to some embodiments.

DETAILED DESCRIPTION

Figure 1:
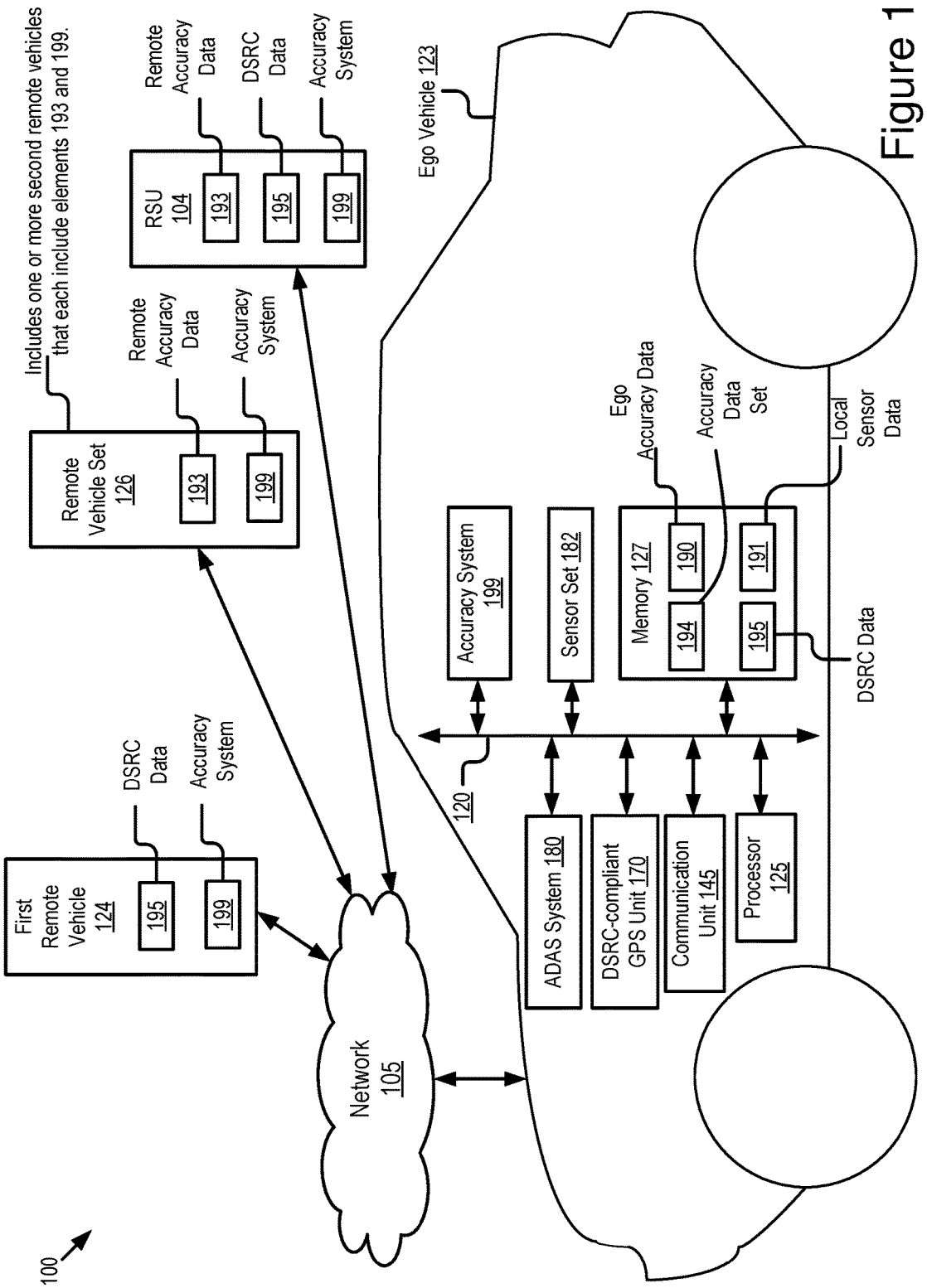
FIG. 1 is a block diagram illustrating an operating environment for an accuracy system according to some embodiments.

A driver's vehicle may be referred to herein as an "ego vehicle." Assume that the ego vehicle includes an ADAS system. The ego vehicle also includes a sensor set that captures local sensor data that describes the sensor measurements recorded by the sensor set. The ego vehicle may also receive remote sensor data recorded by the sensors of remote vehicles. In some embodiments, the remote sensor data is included in DSRC data that is transmitted via a DSRC message. Both the local sensor data and the remote sensor data may include data that describes a roadway environment that includes both the ego vehicle and one or more remote vehicles. For example, the local senor data and the remote sensor data describe a location, velocity and heading of a particular remote vehicle at a particular point in time. See, e.g., Part 1 of the DSRC data as depicted in FIG. 4B.

Since the functionality provided by the ADAS system is dependent upon the accuracy of the sensor data utilized by the ADAS system when providing its functionality, it would be beneficial if the ADAS system were always provided with the most accurate sensor data available in any circumstance, whether it be the local sensor data or the remote data. For example, the ego vehicle includes a set of ADAS systems which render the ego vehicle an HAV and the set of ADAS systems requires accurate remote sensor data to avoid a collision with a particular remote vehicle. The ego vehicle may include an accuracy system that solves this problem by determining an accuracy of remote sensor data which is received from the particular remote vehicle (the remote sensor data may be included in DSRC data) and determining whether to input this remote sensor data into the set of ADAS systems based on whether it is accurate.

The remote sensor data may be sourced from one or more remote sources. Examples of remote sources include a remote vehicle and a roadside unit ("RSU"). The RSU may relay remote sensor data to the ego vehicle, for example, if the remote vehicle is outside of DSRC range of the ego vehicle. Optionally, the RSU may include a set of sensors that records its own remote sensor data which may then be related to the ego vehicle via DSRC or some other wireless communication protocol.

In some embodiments, the accuracy system may provide a notification to a driver of the vehicle to inform them of which of the local sensor data and the remote sensor data is more accurate for a given time or time frame. The notification provided to the driver of the vehicle may include a visual notification such as a graphical user interface ("GUI"), an audio notification such as audio generated by one or more speakers or a combination of a visual notification and an audio notification provided simultaneously or contemporaneously.

The visual notification may be provided by a heads-up display unit or an electronic panel. The heads-up display unit may include a three-dimensional heads-up display unit such as the one described in U.S. patent application Ser. No. 15/080,433 filed on Mar. 24, 2016 and entitled "Wireless Data Sharing Between a Mobile Client Device and a Three-Dimensional Heads-Up Display Unit," the entirety of which is herein incorporated by reference. The electronic panel may be an element of a head-unit or an infotainment system installed in the vehicle.

The audio notification may be provided by one or more speakers that are operated by the head-unit, infotainment system or navigation system of the vehicle.

Examples of a Wireless Messages Including Remote Sensor Data

Vehicles are increasingly equipped with DSRC. A vehicle equipped with DSRC may be referred to as "DSRC-equipped" or "DSRC-enabled." A DSRC-equipped vehicle may include a DSRC antenna and any hardware of software necessary to send and receive DSRC messages, generate DSRC messages and read DSRC messages. For example, a DSRC-equipped vehicle may include any hardware or software necessary to receive a DSRC message, retrieve data included in the DSRC message and read the data included in the DSRC message. The DSRC antenna includes a DSRC transceiver and a DSRC receiver which are operable to legally send and receive DSRC messages in the jurisdiction where the vehicle (e.g., the ego vehicle) is located over a 75 megahertz (MHz) spectrum in the 5.9 gigahertz (GHz) band.

In some embodiments, the primary allocation for DSRC communicates is 5.850 to 5.925 GHz, which includes the following channels: channel 172, which is used for sending and receiving BSM and a small set of vehicle-to-infrastructure safety applications; channel 174, which is used for infrastructure-to-vehicle messages and avoidance of cross-channels interference with channel 172; channel 176, which is used for pedestrian safety messages and security credential management; channel 178, which is used for Wireless Access in Vehicular Environments (WAVE) service advertisements (i.e., to notify vehicles that WAVE service is available for a particular geographic region); channel 180 which is used for non-BSM related vehicle-to-vehicle safety messages and mobility; channel 182, which is used for infrastructure-to-vehicle safety and mobility messages; and channel 184, which is designated for public safety messages. The descriptions provided for these channels is intended to be illustrative but not exclusive.

In some embodiments, DSRC messages are used to transmit remote sensor data from a remote vehicle to an ego vehicle. There are many types of DSRC messages. One type of DSRC message is known as a BSM. DSRC-equipped vehicles broadcast a BSM at a regular interval. In some embodiments, the interval is user adjustable.

A BSM includes DSRC data. The DSRC data describes attributes of the vehicle that originally transmitted the BSM. Vehicles equipped with DSRC broadcast BSMs at an adjustable rate. In some embodiments, the rate may be once every 0.10 seconds. The BSM includes DSRC data that describes, among other things, one or more of the following: (1) a timestamp describing a particular time; (2) the vehicle position data (sometimes referred to as "global positioning system data" or "GPS data") describing a location of the vehicle that transmits the BSM at the time described by the timestamp; (3) the velocity of the vehicle that transmits the BSM at the time described by the timestamp; and (4) the heading of the vehicle that transmits the BSM at the time described by the timestamp. FIGS. 4A and 4B, which are described below, depict examples of DSRC data according to some embodiments. Part 1 of the DSRC data includes the remote sensor data according to some embodiments. See, e.g., FIG. 4B.

In some embodiments, DSRC-equipped vehicles may probe other DSRC-equipped vehicles/devices along the roadway for information describing their current and future conditions, including their path history, future path and remote sensor data they may have received or generated. This information is described as "DSRC probe data." DSRC probe data may include any data received via a DSRC probe or responsive to a DSRC probe.

A DSRC message may include DSRC-based data. The DSRC-based data may include DSRC data or DSRC probe data. In some embodiments, the DSRC-based data included in a DSRC message may include DSRC data or DSRC probe data received from a plurality of DSRC-equipped vehicles (or other DSRC-equipped devices). This DSRC data or DSRC probe data may include an identifier of its source and the location of the source or any traffic events described by the DSRC data or DSRC probe data. In some embodiments, the DSRC probe data includes remote sensor data such as that included in Part 1 of the DSRC data.

In some embodiments, the DSRC-enabled vehicles will include a DSRC-compliant GPS unit. The DSRC data or DSRC probe data may specify which lane a vehicle is traveling in as well as its speed of travel and path history. The DSRC data or DSRC probe data may further specify one or more of the following: a velocity of the vehicle at one or more different times or one or more different locations; a heading of the vehicle at one or more different times or one or more different locations; and an acceleration of the vehicle at one or more different times or one or more different locations.

Another type of wireless message is a full-duplex wireless message described in U.S. patent application Ser. No. 14/471,387 filed on Aug. 28, 2014 and entitled "Full-Duplex Coordination System," the entirety of which is herein incorporated by reference.

Examples of Lane Level Accuracy

Vehicles are also increasingly manufactured to include GPS-based navigation systems. A GPS-based navigation system may provide navigation routes to a driver that are based on vehicle position data and knowledge about queue lengths along roadways.

Lane level accuracy may mean that the location of a vehicle is described so accurately that the vehicle's lane of travel may be accurately determined. In the context of the accuracy system, lane level accuracy enables the accuracy system to more accurately determine the region ID for the ego vehicle, and thus more accurately determine whether the local sensor data or the remote sensor data is more accurate at a given time or time frame. A conventional GPS system is unable to determine the location of a vehicle with lane-level accuracy. For example, a typical lane of a roadway is approximately 3 meters wide. However, a conventional GPS system may only have an accuracy of plus or minus 10 meters relative to the actual location of the vehicle.

A DSRC-compliant GPS unit can provide vehicle position data describing the location of a vehicle with lane-level accuracy. A DSRC-compliant GPS unit may include hardware that wirelessly communicates with a GPS satellite to retrieve vehicle position data that describes a location of a vehicle with a precision that is compliant with the DSRC standard. The DSRC standard requires that vehicle position data be precise enough to infer if two vehicles are in the same lane. The lane may be a lane of a roadway. A DSRC-compliant GPS unit may be operable to identify, monitor and track its two-dimensional position within 1.5 meters of its actual position 68% of the time under an open sky. Since lanes of a roadway are typically no less than 3 meters wide, whenever the two-dimensional error of the vehicle position data is less than 1.5 meters the accuracy system described herein may analyze the vehicle position data provided by the DSRC-compliant GPS unit and determine what lane of the roadway the vehicle is traveling in based on the relative positions of vehicles on the roadway.

The accuracy system described herein may determine a region ID for the remote vehicle based on vehicle position data provided by a DSRC-compliant GPS unit.

ADAS System

The ego vehicle described herein includes a set of ADAS systems. The set of ADAS systems includes one or more ADAS systems. Examples of an ADAS system may include one or more of the following elements of an ego vehicle: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

The ADAS system may also include any software or hardware included in the ego vehicle that makes that ego vehicle be an autonomous vehicle or a semi-autonomous vehicle.

Digital Data

Various types of data are described herein, including, for example, sensor data such as the local sensor data and the remote sensor data, the DSRC data, remote accuracy data, ego accuracy data and threshold data. These types of digital data, as well as any other type of data described herein, refer to digital data which is digitally storable on a non-transitory memory.

Example Overview

Referring to FIG. 1, depicted is an operating environment 100 for an accuracy system 199. The operating environment 100 may include one or more of the following elements: an ego vehicle 123; a first remote vehicle 124; a remote vehicle set 126 that includes one or more second remote vehicles; and a roadside unit 104 ("RSU 104"). These elements of the operating environment 100 may be communicatively coupled to a network 105. Although not depicted in FIG. 1, in some embodiments the operating environment 100 includes a server which is operated by a manufacturer of one or more of the ego vehicle 123, the first remote vehicle 124 and the second vehicles included in the remote vehicle set 126.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, etc. The network 105 may also include a mobile data network that may include 3G, 4G, LTE, VoLTE or any other cellular network, mobile data network or combination of mobile data networks. Further, the network 105 may include one or more IEEE 802.11 wireless networks.

In some embodiments, one or more of the ego vehicle 123, the first remote vehicle 124, the one or more second remote vehicles included in the remote vehicle set 126 and the RSU 104 are DSCR-equipped. The network 105 may include one or more communication channels shared among the ego vehicle 123 and one or more other wireless communication devices (e.g., one or more first remote vehicles 124, one or more second remote vehicles, one or more RSUs 104, one or more servers 103, etc.). The communication channel may include DSRC, full-duplex wireless communication or any other wireless communication protocol. For example, the network 105 may be used to transmit a DSRC message, DSRC probe or BSM including DSRC data 195 to the ego vehicle 123.

The ego vehicle 123, the first remote vehicle 124 and the one or more second remote vehicles included in the remote vehicle set 126 may include the same or similar elements. Two or more of the ego vehicle 123, the first remote vehicle 124 and the second remote vehicles 126 may share a connection or association. For example, the ego vehicle 123 and the first remote vehicle 124 may share a common manufacturer (e.g., Toyota) and the functionality described herein may only be provided to vehicles having this common manufacturer.

The ego vehicle 123 may include a car, a truck, a sports utility vehicle, a bus, a semi-truck, a drone or any other roadway-based conveyance. In some embodiments, the ego vehicle 123 may include an autonomous vehicle or a semi-autonomous vehicle. For example, the ego vehicle 123 may include an ADAS system. In some embodiments, the ego vehicle 123 is a HAV.

The ego vehicle 123 may include one or more of the following elements: a sensor set 182; a processor 125; a memory 127; a communication unit 145; a DSRC-compliant GPS unit 170; an ADAS system 180; and an accuracy system 199. In some embodiments, the ADAS system 180 is an element of an ADAS system set that includes a plurality of ADAS systems 180. These elements of the ego vehicle 123 may be communicatively coupled to one another via a bus 120.

In some embodiments, the processor 125 and the memory 127 may be elements of an onboard vehicle computer system (not pictured). The onboard vehicle computer system may be operable to cause or control the operation of the accuracy system 199. The onboard vehicle computer system may be operable to access and execute the data stored on the memory 127 to provide the functionality described herein for the accuracy system 199 or its elements. For example, the ego vehicle 123 includes an electronic control unit (ECU) or some other onboard unit specialized for vehicular application, and this processor-based computing device is the onboard vehicle computer system.

The sensor set 182 may include one or more sensors that are operable to measure the physical environment outside of the ego vehicle 123. For example, the sensor set 182 may record one or more physical characteristics of the physical environment that is proximate to the ego vehicle 123.

In some embodiments, the sensor set 182 may include one or more of the following vehicle sensors: a camera; a LIDAR sensor; a laser altimeter; a navigation sensor (e.g., a global positioning system sensor of the DSRC-compliant GPS unit 170); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 182 may be operable to record local sensor data 191 that describes one or more of the following: one or more locations of the first remote vehicle 124 at one or more different times; the velocities of the first remote vehicle 124 at the one or more different times; the headings of the first remote vehicle 124 at the one or more different times; and timestamps that describe the one or more different times. The local sensor data 191 is stored in the memory 127.

In some embodiments, the sensor set 182 includes one or more sensors that are operable to record digital data that describes any of the information included in the DSRC data 195. See, e.g., FIGS. 4A and 4B.

The processor 125 includes an arithmetic logic unit, a microprocessor, a general purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 includes a single processor 125, multiple processors may be included. Other processors, operating systems, sensors, displays, and physical configurations may be possible.

The memory 127 stores instructions or data that may be executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 1, in some embodiments the memory 127 stores one or more of the following elements: the local sensor data 191; the DSRC data 195; the accuracy data set 194; and the ego accuracy data 190. In some embodiments, the DSRC data 195 is an element of the accuracy data set 194.

The local sensor data 191 is described above with reference to the sensor set 182, and so, that description will not be repeated here. The local sensor data 191 is digital data that describes, among other things, information about the first remote vehicle 124 such as its location, velocity and heading at one or more times. In this way the local sensor data 191 describes information about the first remote vehicle 124 as recorded by the local sensors of the ego vehicle 123.

The DSRC data 195 is digital data that describes information about the first remote vehicle 124 as recorded by the onboard sensors of the first remote vehicle 124. For example, the first remote vehicle 124 includes its own sensor set 182 and these sensors record DSRC data 195 that describes, among other things, information about the first remote vehicle 124 such as its location, velocity and heading at one or more times. The DSRC data 195 is described in more detail below with reference to FIGS. 4A and 4B. The first remote vehicle 124 is a DSRC-enabled vehicle and broadcasts BSMs at a regular interval. The BSMs include the DSRC data 195. The communication unit 145 of the ego vehicle 123 receives the BSMs, and in this way the ego vehicle 123 receives the DSRC data 195.

In some embodiments, the DSRC data 195 is included in some other type of DSRC message that is transmitted to the ego vehicle 123 by the first remote vehicle 124.

The accuracy data set 194 is a data structure that stores one or more instances of remote accuracy data 193. The remote accuracy data 193 is digital data that describes whether the DSRC data 195 provided by the first remote vehicle 124 is accurate. For example, the second remote vehicles included in the remote vehicle set 126 each include an accuracy system 199. The accuracy systems 199 of these second remote vehicles each execute one or more of the following steps: (1) determine, based on their own local sensor data 191 as recorded by the onboard sensors of these second remote vehicles, whether the DSRC data 195 being provided by the first remote vehicle 124 is accurate [e.g., whether the location information included in the DSRC data 195 is accurate about the location of the first remote vehicle 124 at a particular time, whether the velocity information included in the DSRC data 195 is accurate about the velocity of the first remote vehicle at a particular time; whether the heading information included in the DSRC data 195 is accurate about the velocity of the first remote vehicle at a particular time, etc.); (2) generate remote accuracy data 193 that describes their determination of whether the first remote vehicle 124 is providing accurate DSRC data 195 about itself; (3) receive a request for remote accuracy data 193 from the ego vehicle 123; and (4) provide the remote accuracy data 193 to the ego vehicle 123. In this way the accuracy system 199 of the ego vehicle 123 receives a plurality of instances of remote accuracy data 193 from the remote vehicle set 126 and builds the accuracy data set 194 based on the remote accuracy data 193 received from the one or more second remote vehicles.

In some embodiments, the remote accuracy data 193 describing the first remote vehicle 124 may vary from one second remote vehicle to another second remote vehicle. For example, one second remote vehicle may determine that the first remote vehicle 124 is providing accurate or trustworthy DSRC data 195, whereas another second remote vehicle may determine that the first remote vehicle 124 is not providing accurate or trustworthy DSRC data 195. In this way the accuracy data set 194 is not homogeneous in its description of the accuracy of the DSRC data 195 being provided by the first remote vehicle 124, and whether the first remote vehicle 124 is trustworthy. As used herein, the term "trustworthy" refers to whether the onboard sensors of the first remote vehicle 124 are providing accurate DSRC data 195. If the DSRC data 195 is accurate, then the first remote vehicle 124 is trustworthy. If the DSRC data 195 is not accurate, then the first remote vehicle 124 is not trustworthy.

The ego accuracy data 190 is digital data that describes whether the first remote vehicle 125 has provided accurate DSRC data 195 as determined by the accuracy system 199 of the ego vehicle. In some embodiments, the accuracy system 199 receives one or more of the following as inputs: the local sensor data 191 describing the first remote vehicle 124; DSRC data 195 describing the first remote vehicle 124; and an accuracy data set 194 including one or more instances of remote accuracy data 193 describing the first remote vehicle 124. In some embodiments, the accuracy system 199 includes code and routines that are operable, when executed by the processor 125 of the ego vehicle 123, to cause the processor 125 to receive these inputs, determine the ego accuracy data 190 based these inputs and then determine whether to provide the DSRC data 195 as an input to the ADAS system 180 based on the ego accuracy data 190.

In some embodiments, if the ego accuracy data 190 describes the DSRC data 195 received from the first remote vehicle 124 as being inaccurate, then the DSRC data 195 is not provided as an input the ADAS system 180. Optionally, all future instances of DSRC data 195 received from the first remote vehicle 124 are discarded or otherwise not provided to the ADAS system 180 without further analysis of whether these future instances of DSRC data 195 are accurate since, for example, the first remote vehicle 124 is not trustworthy. Optionally, steps may be taken to cause the first remote vehicle 124 to have its local sensors serviced, replaced or updated so that its DSRC data 195 is accurate in the future. If the ego accuracy data 190 describes the DSRC data 195 received from the first remote vehicle 124 as being accurate, then the DSRC data 195 is provided as an input the ADAS system 180.

Figure 5:
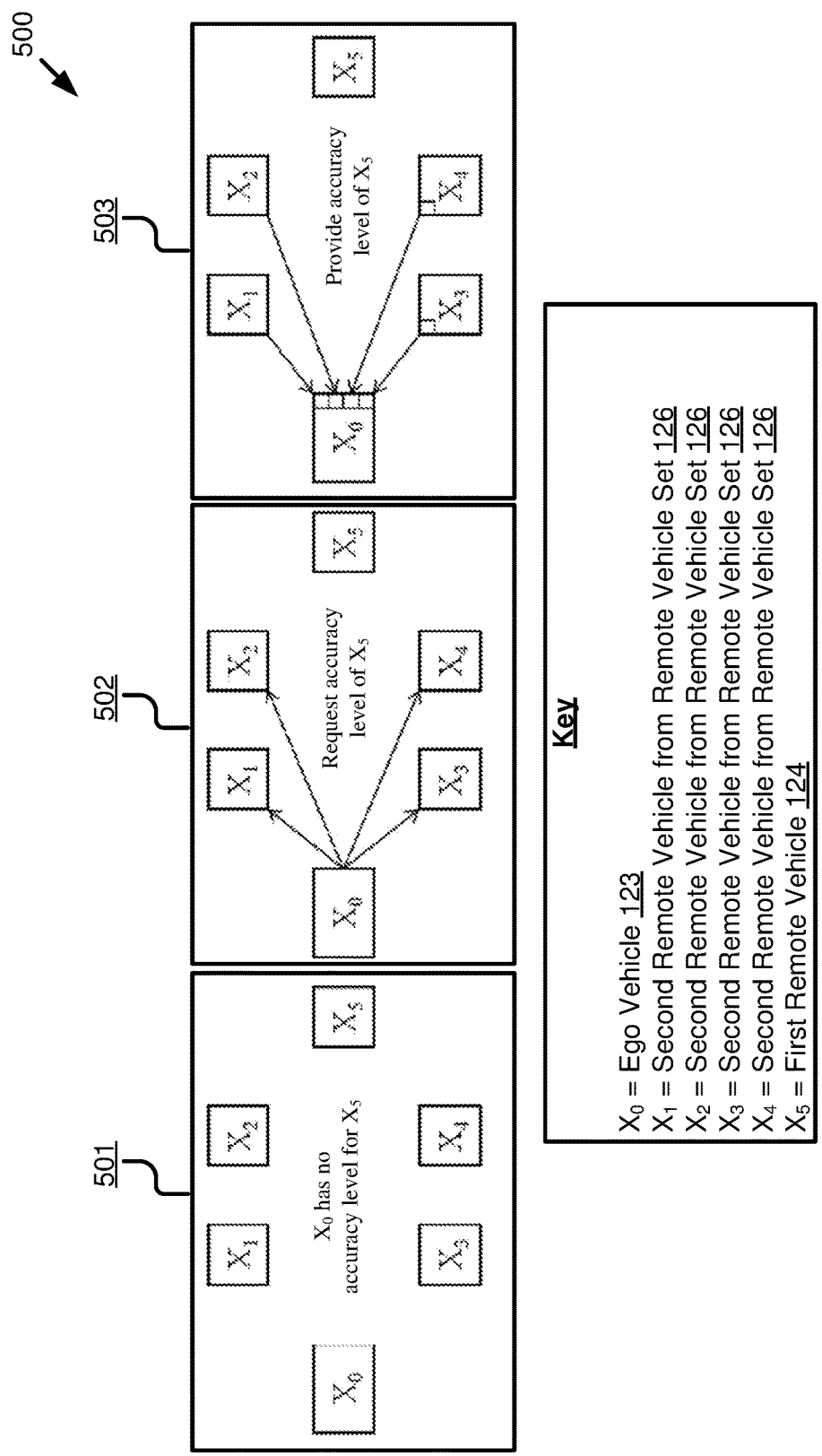
FIGS. 5-7 are block diagrams illustrating an example use case of the accuracy system according to some embodiments.
Figure 6:
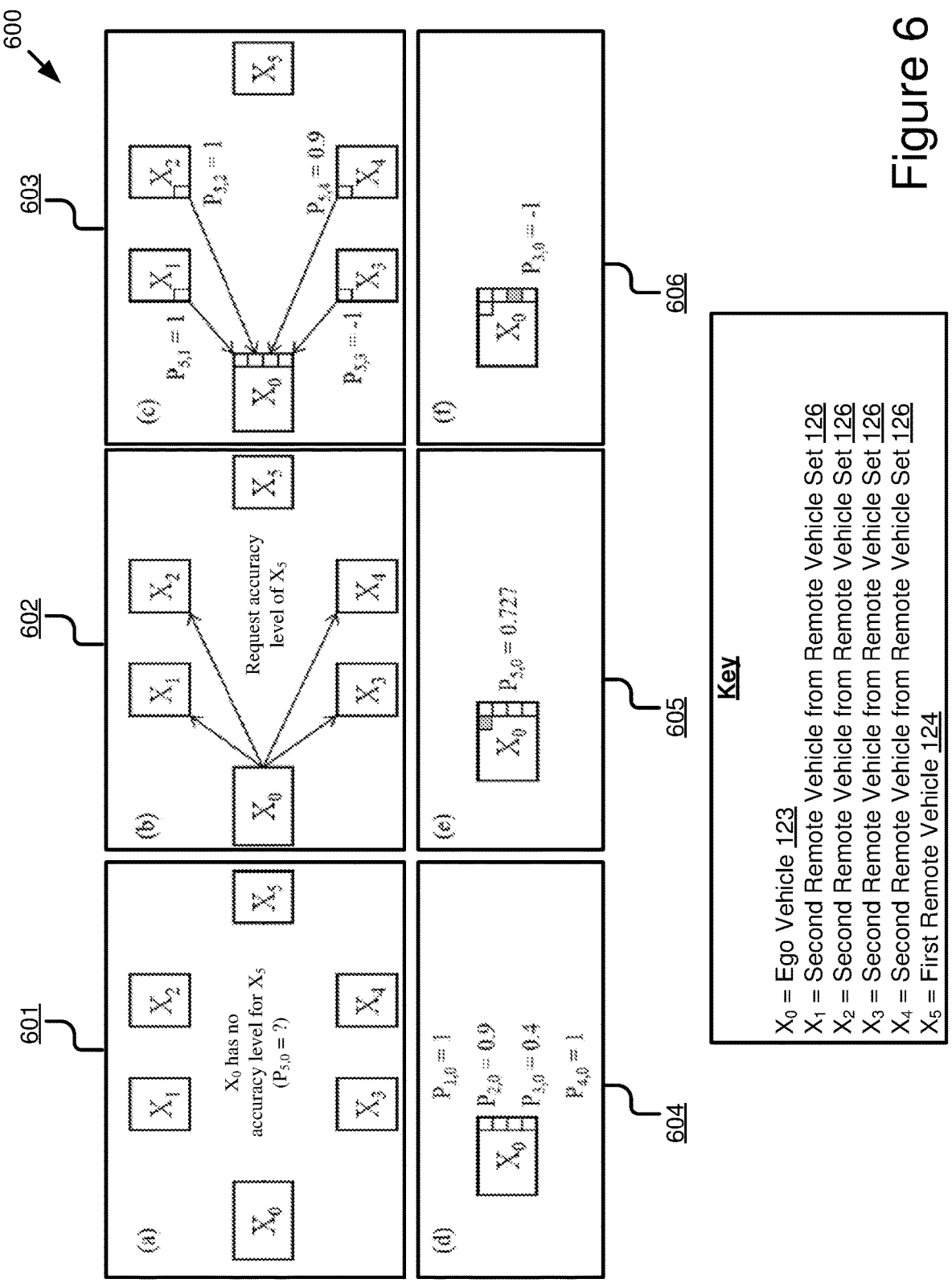
Figure 7:
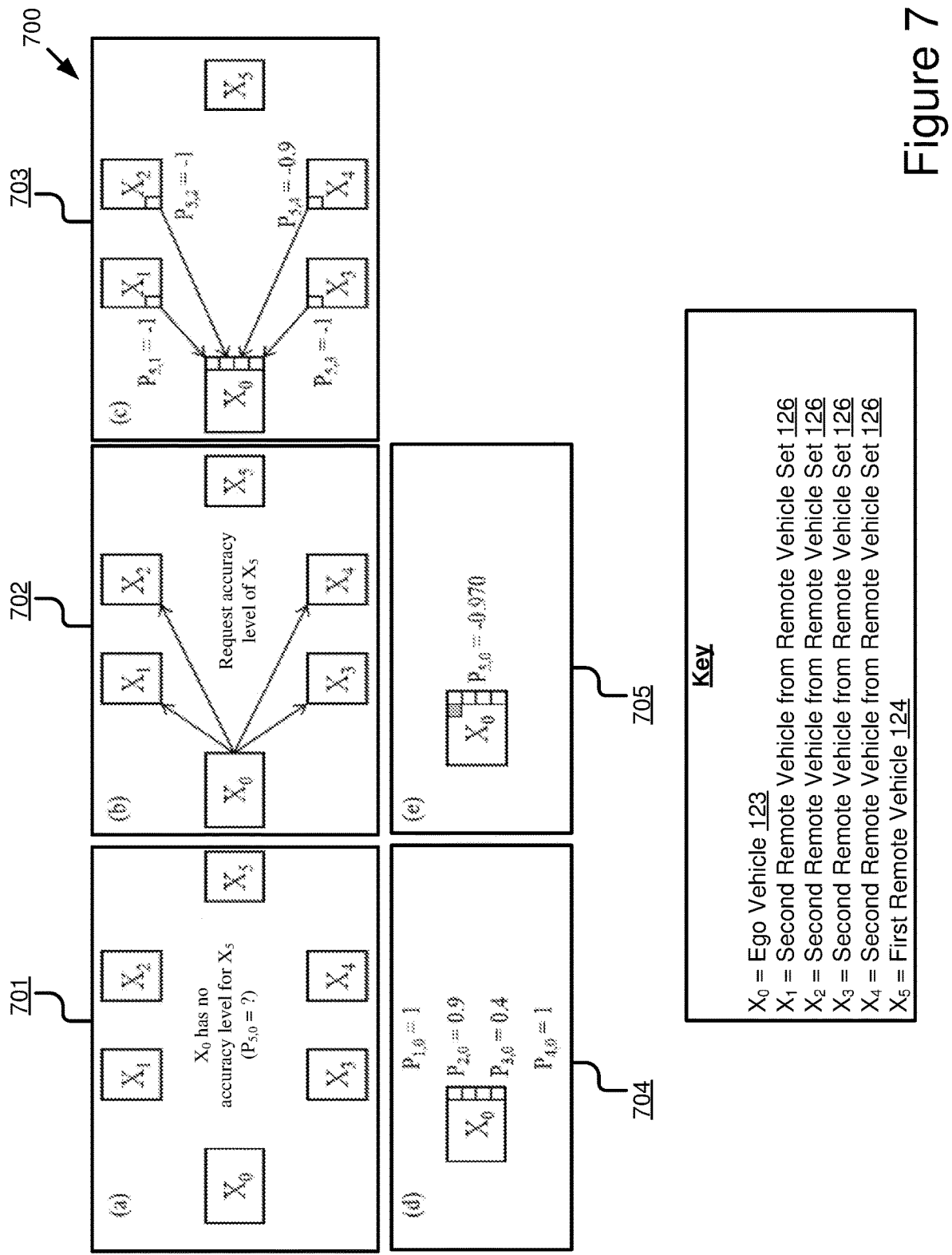

In some embodiments, the ego accuracy data 190 describes an accuracy level for the DSRC data 195 provided by the first remote vehicle 124 and whether the first remote vehicle 124 is trustworthy. The accuracy level is a number. The accuracy level may be required satisfy a predetermined threshold in order for the ego accuracy data 190 to indicate that the first remote vehicle 124 is trustworthy. The memory 127 stores threshold data that describes the predetermined threshold. The threshold data is not depicted in FIG. 1. In some embodiments, the remote accuracy data 193 included in the accuracy data set 194 also describes one or more accuracy levels for the DSRC data 195 provided by the first remote vehicle 124, and these one or more accuracy levels are determined by the accuracy systems 199 of the one or more second remote vehicles included in the remote vehicle set 126. See, e.g., FIGS. 5-7 in which the ego accuracy data 190 (referred to in FIG. 7 as "$P_{5,0}$") is determined, based in part, on a plurality of instances of remote accuracy data 193 ($P_{5,1}$, $P_{5,2}$, $P_{5,3}$, $P_{5,4}$). The block labeled $X_0$ in FIGS. 5-7 is an example embodiment of the ego vehicle 123, the block labeled $X_5$ is an example embodiment of the first remote vehicle 124 and the blocks labeled $X_1$, $X_2$, $X_3$ and $X_4$ are examples of second remote vehicles that are included in the remote vehicle set 126. The accuracy system 199 of the ego vehicle 123 compares the ego accuracy data 190 to the threshold data to determine whether the predetermined threshold is satisfied, and in this way determines whether the DSRC data 195 for the first remote vehicle 124 will be provided as an input the ADAS system 180.

In some embodiments, the ego accuracy data 190 describes whether particular sensor measurements (e.g., location, speed, heading, etc.) included in the DSRC data 195 are accurate.

Referring back to FIG. 1, the communication unit 145 transmits and receives data to and from a network 105 or to another communication channel. In some embodiments, the communication unit 145 may include a DSRC transceiver, a DSRC receiver and other hardware or software necessary to make the ego vehicle 123 a DSRC-enabled device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

Although not depicted in FIG. 1, in some embodiments the first remote vehicle 124, second remote vehicles and RSU include a communication unit 145. In some embodiments, the communication unit 145 may include code or routines that build and transmit a wireless message to the network 105 that includes DSRC data 195. For example, the first remote vehicle 124, one or more second remote vehicles or the RSU 104 include a communication unit 145 that causes a wireless message including the DSRC data 195 to be transmitted to the ego vehicle 123. The wireless message may include a DSRC message, a DSRC probe, a BSM or a full-duplex wireless message or any other type of wireless message transmitted via any other wireless communication method or protocol. The communication unit 145 of the ego vehicle 123 may receive the wireless message including the DSRC data 195.

In some embodiments, the communication unit 145 of the ego vehicle 123 may provide the DSRC data 195 to the accuracy system 199 or store the DSRC data 195 on the memory 127.

The DSRC-compliant GPS unit 170 may include hardware that wirelessly communicates with a GPS satellite to retrieve vehicle position data that describes a location of the ego vehicle 123. In some embodiments, a DSRC-compliant GPS unit 170 is operable to provide vehicle position data that describes the location of the ego vehicle 123 to a lane-level degree of precision. This vehicle position data is included in Part 1 of the DSRC data 195. The DSRC standard requires that vehicle position data be precise enough to infer if two vehicles (such as ego vehicle 123 and another vehicle on the same roadway as the ego vehicle 123) are in the same lane. The DSRC-compliant GPS unit 170 may be operable to identify, monitor and track its two-dimensional position within 1.5 meters of its actual position 68% of the time under an open sky. Since lanes of a roadway are typically no less than 3 meters wide, whenever the two-dimensional error of the vehicle position data is less than 1.5 meters the accuracy system 199 may analyze the vehicle position data provided by the DSRC-compliant GPS unit 170 and determine what lane of the roadway the ego vehicle 123 is traveling in based on the relative positions of vehicles on the roadway.

By comparison, a GPS unit which is not compliant with the DSRC standard is far less accurate than the DSRC-compliant GPS unit 170 and not capable of reliably providing lane-level accuracy, as is the DSRC-compliant GPS unit 170. For example, a non-DSRC-compliant GPS unit may have an accuracy on the order of 10 meters, which is not sufficiently precise to provide the lane-level degree of precision provided by the DSRC-compliant GPS unit 170. For example, since a lane may be as narrow as 3 meters wide, the DSRC standard may require a DSRC-compliant GPS unit 170 to have an accuracy on the order of 1.5 meters, which is significantly more precise than a non-DSRC-compliant GPS unit as described above.

The ADAS system 180 is an advanced driver assistance system such as those described above.

In some embodiments, the ADAS system 180 includes any hardware or software that controls one or more operations of the ego vehicle 123 so that the ego vehicle 123 is "autonomous" or "semi-autonomous." For example, the ego vehicle 123 includes a set of ADAS systems 180 that render the ego vehicle 123 one of the following: a Level 1 autonomous vehicle; a Level 2 autonomous vehicle; a Level 3 autonomous vehicle; a Level 4 autonomous vehicle; a Level 5 autonomous vehicle; and an HAV.

In some embodiments, the accuracy system 199 includes code and routines that are operable, when executed by the processor 125, to cause the processor 125 to execute one or more of the steps described below with reference to FIG. 3. In some embodiments, the accuracy system 199 includes code and routines that are operable, when executed by the processor 125, to cause the processor 125 to execute one or more steps such as those described below with reference to FIGS. 5-7.

In some embodiments, the accuracy system 199 includes code and routines that are operable, when executed by the processor 125, to cause the processor 125 to execute one or more of the following steps: (1) receiving the DSRC data 195 that describes the first remote vehicle 124; (2) causing the local sensors included in the sensor set 182 to generate the local sensor data 191; (3) determining that the local sensor data 191 and the DSRC data 195 describe the first remote vehicle 124 differently [e.g., the location of the first remote vehicle 124 at a given time is described differently, the velocity of the first remote vehicle 124 at the given time is described differently, the heading of the first remote vehicle 124 at the given time is described differently, etc.]; (4) requesting remote accuracy data 193 from the second remote vehicles included in the remote vehicle set 126; (5) receiving the remote accuracy data 193 from one or more second remote vehicles; (6) building the accuracy data set 194 based on the remote accuracy data 193 received from the one or more second remote vehicles; (7) determining the ego accuracy data 190 based on one or more of the DSRC data 195, the local sensor data 191 and the remote accuracy data 193 received from the one or more second remote vehicles; and (8) determining whether to provide the DSRC data 195 received from the first remote vehicle 124 to the ADAS system 180 based on the ego accuracy data 190.

In some embodiments, the accuracy system 199 may be implemented using hardware including a field-programmable gate array ("FPGA") or an application-specific integrated circuit ("ASIC"). In some other embodiments, the accuracy system 199 may be implemented using a combination of hardware and software. The accuracy system 199 may be stored in a combination of the devices (e.g., servers or other devices), or in one of the devices.

The accuracy system 199 is described in more detail below with reference to FIGS. 2, 3 and 5-7.

Although not depicted in FIG. 1, in some embodiments the ego vehicle 123 may include a full-duplex coordination system as described in U.S. patent application Ser. No. 14/471,387 filed on Aug. 28, 2014 and entitled "Full-Duplex Coordination System." In some embodiments, the full-duplex coordination system of the ego vehicle 123 receives a full-duplex wireless message that includes the DSRC data 195.

The first remote vehicle 124 includes elements similar to the ego vehicle 123, and so, those descriptions will not be repeated here. The first remote vehicle 124 includes, among other things, a non-transitory memory that stores the DSRC data 195 and an accuracy system 199. The accuracy system 199 of the first remote vehicle 124 includes a communication unit (similar to the communication unit 145) that provides the DSRC data 195 to the ego vehicle 123 (and other connected vehicles such as the second remote vehicles of the remote vehicle set 126) via the network 105. The first remote vehicle 124 includes a sensor set (similar to the sensor set 182) that measures sensor data that describe the information that is necessary to populate the DSRC data 195. For example, the sensor set of the first remote vehicle 124 measures sensor data that describes the location of the first remote vehicle 124 at a given time, the velocity of the first remote vehicle 124 at the given time and the heading of the first remote vehicle 124 at the given time. This sensor data is then stored in a DSRC message (e.g., a BSM) as DSRC data 195 by the communication unit of the first remote vehicle 124 or the accuracy system 199 of the first remote vehicle 124. The DSRC message is provided to the network 105 by the communication unit of the first remote vehicle 124. In this way the first remote vehicle 124 provides DSRC data 195 to the ego vehicle 123 that describes information about the first remote vehicle 124.

Figure 2:
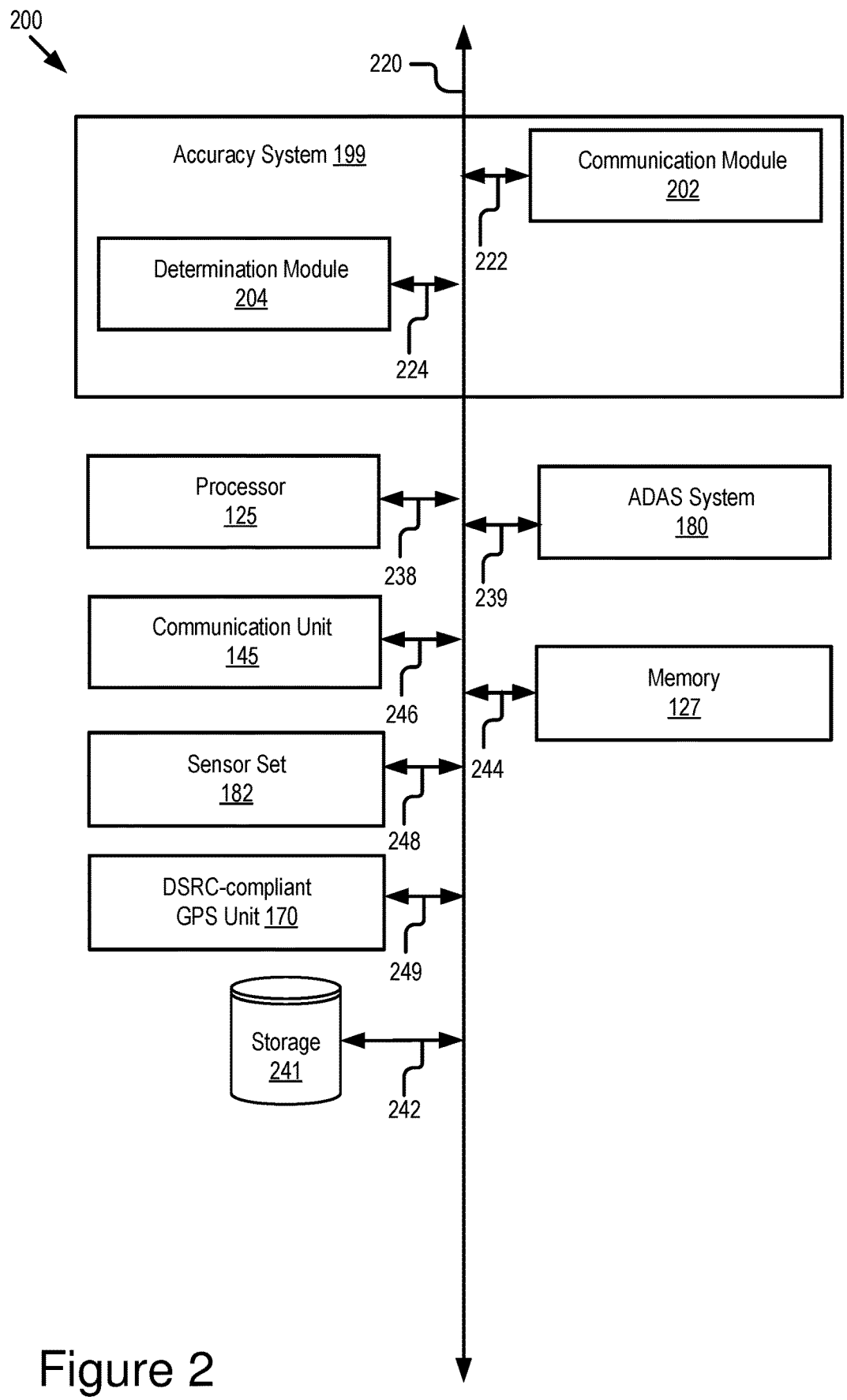
FIG. 2 is a block diagram illustrating an example computer system including an accuracy system according to some embodiments.

In some embodiments, the first remote vehicle 124 includes a computer system 200 such as that depicted in FIG. 2.

The remote vehicle set 126 includes one or more second remote vehicles. Examples of the second remote vehicles are depicted in FIGS. 5-7. The one or more second remote vehicles of the remote vehicle set 126 include elements similar to the ego vehicle 123, and so, those descriptions will not be repeated here. In some embodiments, the second remote vehicles each include a computer system 200 such as that depicted in FIG. 2.

The remote vehicle set 126 includes, among other things, one or more second remote vehicles. In some embodiments, each of the second remote vehicles includes a non-transitory memory that stores an accuracy system 199 and remote accuracy data 193. The remote vehicle set 126 will now be described by reference to the one or more second remote vehicles that are included in the remote vehicle set 126. For simplicity, reference is sometimes made to a single second remote vehicle. However, it is to be understood that each of the second remote vehicles include similar elements such that describing a single second remote vehicle helps to explain the functionality of the remote vehicle set 126 as a whole.

In some embodiments, a second remote vehicle includes a non-transitory memory that stores the remote accuracy data 193 (as well as sensor data and other digital data that is used to generate the remote accuracy data 193) and the accuracy system 199. The second remote vehicle includes a communication unit (similar to the communication unit 145) that provides the remote accuracy data 193 to the ego vehicle 123 via the network 105. The second remote vehicle includes a sensor set (similar to the sensor set 182) that measures sensor data that describes the information that is necessary for the accuracy system 199 of the second remote vehicle to determine the remote accuracy data 193. For example, the sensor set of the second remote vehicle measures sensor data that describes the location of the first remote vehicle 124 at a given time, the velocity of the first remote vehicle 124 at the given time and the heading of the first remote vehicle 124 at the given time. This sensor data is then used by the accuracy system 199 of a second remote vehicle to determine the remote accuracy data 193. In some embodiments, the remote accuracy data 193 is determined by the determination module 204 in a manner similar to how the ego accuracy data 190 is determined by the accuracy system 199 of the ego vehicle 123. The determination of the remote accuracy data 193 is described in more detail below. In some embodiments, the remote accuracy data 193 is stored in a wireless message that is transmitted by the communication unit of the second remote vehicle to the ego vehicle 123 via the network 105. In this way one or more second remote vehicles provide their remote accuracy data 193 to the ego vehicle 123. The accuracy system 199 of the ego vehicle 123 builds the accuracy data set 194 based on the one or more instances of remote accuracy data 193 provided by the one or more second remote vehicles of the remote vehicle set 126.

The RSU 104 includes a non-transitory memory that stores remote accuracy data 193, DSRC data 195 and an accuracy system 199. The RSU 104 also includes a communication unit (similar to the communication unit 145). The RSU 104 may also include a sensor set (similar to the sensor set 182) that measures the DSRC data 195 and any data necessary to generate the remote accuracy data 193. In the alternative to recording the DSRC data 195 directly using its own sensor set, the RSU 104 may relay DSRC data 195 from the first remote vehicle 124 to the ego vehicle 123. For example, if the ego vehicle 123 is outside of communication range of the first remote vehicle 124, then the RSU 104 may relay a wireless message including the DSRC data 195 to the ego vehicle 123. Similarly, the RSU 104 may relay the remote accuracy data 193 from a second remote vehicle to the ego vehicle 123.

Referring now to FIG. 2, depicted is a block diagram illustrating an example computer system 200 including an accuracy system 199 according to some embodiments.

In some embodiments, the computer system 200 may include a special-purpose computer system that is programmed to perform one or more steps of a method 300 described below with reference to FIG. 3 or the process described below with reference to FIGS. 5-7.

In some embodiments, the computer system 200 may be an element of one or more of the following devices: the ego vehicle 123; the first remote vehicle 124; one or more of the second remote vehicles; and the RSU 104.

In some embodiments, the computer system 200 may be an onboard vehicle computer of a device such as one or more of the following: the ego vehicle 123; the first remote vehicle 124; one or more of the second remote vehicles; and the RSU 104.

In some embodiments, the computer system 200 may include an engine control unit, head unit or some other processor-based computing device of a vehicle such as one or more of the following: the ego vehicle 123; the first remote vehicle 124; and one or more of the second remote vehicles.

The computer system 200 may include one or more of the following elements according to some examples: the accuracy system 199; the processor 125; the communication unit 145; the sensor set 182; the DSRC-compliant GPS unit 170; the ADAS system 180; the memory 127; and a storage 241. The components of the computer system 200 are communicatively coupled by a bus 220.

In the illustrated embodiment, the processor 125 is communicatively coupled to the bus 220 via a signal line 238. The communication unit 145 is communicatively coupled to the bus 220 via a signal line 246. The sensor set 182 is communicatively coupled to the bus 220 via a signal line 248. A DSRC-compliant GPS unit 170 is communicatively coupled to the bus 220 via a signal line 249. The ADAS system 180 is communicatively coupled to the bus 220 via a signal line 239. The storage 241 is communicatively coupled to the bus 220 via a signal line 242. The memory 127 is communicatively coupled to the bus 220 via a signal line 244.

The following elements of the computer system 200 were described above with reference to FIG. 1, and so, those descriptions will not be repeated here: the accuracy system 199; the processor 125; the communication unit 145; the sensor set 182; the DSRC-compliant GPS unit 170; the ADAS system 180; and the memory 127.

The memory 127 may store any of the digital data described herein.

The storage 241 is a non-transitory storage medium that stores data for providing the functionality described herein. The storage 241 may be a dynamic random access memory (DRAM) device, a static random access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the accuracy system 199 includes a communication module 202 and a determination module 204. These components of the accuracy system 199 are communicatively coupled to each other via a bus 220. In some embodiments, components of the accuracy system 199 can be stored in a single server or device. In some other embodiments, components of the accuracy system 199 can be distributed and stored across multiple servers or devices. For example, some of the components of the accuracy system 199 may be distributed across one or more servers, RSUs and the ego vehicle 123.

The communication module 202 can be software including routines for handling communications between the accuracy system 199 and other components of the computer system 200. In some embodiments, the communication module 202 can be a set of instructions executable by the processor 125 to provide the functionality described below for handling communications between the accuracy system 199 and other components of the computer system 200.

The communication module 202 sends and receives data, via the communication unit 145, to and from one or more elements of the operating environment 100. For example, the communication module 202 receives or transmits, via the communication unit 145, one or more of the following elements: the DSRC data 195; the remote accuracy data 193; and any of the wireless messages described herein including requests for remote accuracy data 193.

In some embodiments, the communication module 202 receives data from components of the accuracy system 199 and stores the data in one or more of the storage 241 and the memory 127. For example, the communication module 202 receives any of the digital data described above (e.g., via the network 105, a DSRC message, a BSM, a DSRC probe, a full-duplex wireless message, etc.) and stores this data in the memory 127 (or temporarily in the storage 241 which may act as a buffer).

In some embodiments, the determination module 204 may cause the communication module 202 to communicate with the other elements of the computer system 200.

For example, the determination module 204 may use the communication module 202 to communicate with the sensor set 182 and cause the sensor set 182 to record the local sensor data 191. In another example, the determination module 204 may use the communication module 202 to communicate with the DSRC-compliant GPS unit 170 and cause the DSRC-compliant GPS unit 170 to retrieve vehicle position data. In another example, the determination module 204 may use the communication module 202 to retrieve the remote accuracy data 193 for a particular first remote vehicle 124 from the memory 127 and build the accuracy data set 194 based on the remote accuracy data 193 that describes this particular first remote vehicle 124. In yet another example, the communication unit 145 may receive DSRC data 195 from the network 105 and the determination module 204 may cause the communication module 202 to store the DSRC data 195 in the memory 127. These examples are intended to be illustrative and not limiting.

In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The determination module 204 can be software including routines that are operable, when executed by the processor 125, to cause the processor 125 to execute one or more steps including: (1) receiving the DSRC data 195 that describes the first remote vehicle 124; (2) causing the local sensors included in the sensor set 182 to generate the local sensor data 191; (3) determining that the local sensor data 191 and the DSRC data 195 describe the first remote vehicle 124 differently [e.g., the location of the first remote vehicle 124 at a given time is described differently, the velocity of the first remote vehicle 124 at the given time is described differently, the heading of the first remote vehicle 124 at the given time is described differently, etc.]; (4) requesting remote accuracy data 193 from the second remote vehicles included in the remote vehicle set 126; (5) receiving the remote accuracy data 193 from one or more second remote vehicles; (6) building the accuracy data set 194 based on the remote accuracy data 193 received from the one or more second remote vehicles; (7) determining the ego accuracy data 190 based on one or more of the DSRC data 195, the local sensor data 191 and the remote accuracy data 193 received from the one or more second remote vehicles; and (8) determining whether to provide the DSRC data 195 received from the first remote vehicle 124 to the ADAS system 180 based on the ego accuracy data 190.

The determination module 204 can be software including routines that are operable, when executed by the processor 125, to cause the processor 125 to use one or more of the sensors included in the sensor set 182 to generate the local sensor data 191. For example, the determination module 204 may include code and routines that, when executed by the processor 125, cause the processor 125 to operate one or more of the sensors included in the sensor set 182 to record measurements of the physical environment proximate to the computer system 200 (e.g., a roadway environment that includes the ego vehicle 123 and the first remote vehicle 124).

In some embodiments, the determination module 204 may generate local sensor data 191 describing the measurements of the sensor set 182. The determination module 204 may cause the local sensor data 191 to be stored in the memory 127.

In some embodiments, the communication unit 145 may receive DSRC data 195 from the network 105 and the determination module 204 may cause the communication module 202 to store the DSRC data 195 in the memory.

In some embodiments, the determination module 204 can be software including routines that are operable, when executed by the processor 125, to cause the processor 125 to execute one or more of the following steps: (1) execute one or more sensor of the sensor set 182 to generate the local sensor data 191; (2) store the local sensor data 191 in the memory 127; (3) query the communication unit 145 to receive DSRC data 195 generated by one or more sensors of one or more first remote vehicles 124 or one or more RSUs 104; and (4) store the DSRC data 195 in the memory 127.

In some embodiments, the computer system 200 is an element of a first remote vehicle 124. The memory 127 of the computer system 200 stores DSRC data 195 that describes the first remote vehicle 124 and the accuracy system 199. The communication unit 145 of the computer system 200 provides the DSRC data 195 to the ego vehicle 123 (and other connected vehicles such as the second remote vehicles of the remote vehicle set 126) via the network 105. The determination module 204 of the computer system 200 includes code and routines that are operable, when executed by the processor 125, to control the operation of the sensor set 182 to cause the sensor set 182 to measure sensor data that describes the information necessary to populate the DSRC data 195. For example, the sensor set 182 of the computer system 200 measures sensor data that describes the location of the first remote vehicle 124 at a given time, the velocity of the first remote vehicle 124 at the given time and the heading of the first remote vehicle 124 at the given time. This sensor data is then stored in a DSRC message (e.g., a BSM) as DSRC data 195 by the communication module 202 or the communication unit 145. The communication module 202 includes code and routines that are operable, when executed by the processor 125, to cause the processor to control the operation of the communication unit 145 to cause the communication unit 145 to provide the DSRC message to the network 105. In this way the first remote vehicle 124 provides DSRC data 195 to the ego vehicle 123 that describes information about the first remote vehicle 124.

In some embodiments, the computer system 200 is an element of a second remote vehicle. The memory 127 of the computer system 200 stores the remote accuracy data 193 (as well as sensor data and other digital data that is used to generate the remote accuracy data 193) and the accuracy system 199. The computer system 200 of the second remote vehicle also includes the communication unit 145. The communication module 202 includes code and routines that are operable, when executed by the processor 125, to cause the communication unit 145 to provide the remote accuracy data 193 to the ego vehicle 123 via the network 105. For example, the communication unit 145 receives a request for the remote accuracy data 193 from the network 105 (e.g., because such a request was transmitted by the ego vehicle 123) and the communication module 202 provides this request to the determination module 204. The computer system 200 of the second remote vehicle includes a sensor set 182. The determination module 204 includes code and routines that are operable, when executed by the processor 125, to control the operation of the sensor set 182 to cause the sensor set 182 to measure sensor data that describes the information that is necessary for the determination module 204 to determine the remote accuracy data 193. For example, the sensor set 182 of the computer system 200 measures sensor data that describes the location of the first remote vehicle 124 at a given time, the velocity of the first remote vehicle 124 at the given time and the heading of the first remote vehicle 124 at the given time. This sensor data is then used by determination module 204 to determine the remote accuracy data 193. In some embodiments, the remote accuracy data 193 is determined by the accuracy system 199 of the second remote vehicle in a manner similar to how the ego accuracy data 190 is determined by the ego vehicle 123.

The determination of the remote accuracy data 193 is described in more detail below. In some embodiments, the remote accuracy data 193 is stored in a wireless message by the communication module 202 of the computer system 200. The communication module 202 then cause the communication unit 145 of the computer system 200 to provide the wireless message to the ego vehicle 123 via the network 105. The ego vehicle 123 also includes an embodiment of the compute system 200, and the determination module of the ego vehicle 123 includes software that builds the accuracy data set 194 based on remote accuracy data 193 provided by the one or more second remote vehicles.

In some embodiments, the determination module 204 can be stored in the memory 127 of the computer system 200 and can be accessible and executable by the processor 125. The determination module 204 may be adapted for cooperation and communication with the processor 125 and other components of the computer system 200 via the signal line 224.

Figure 3:
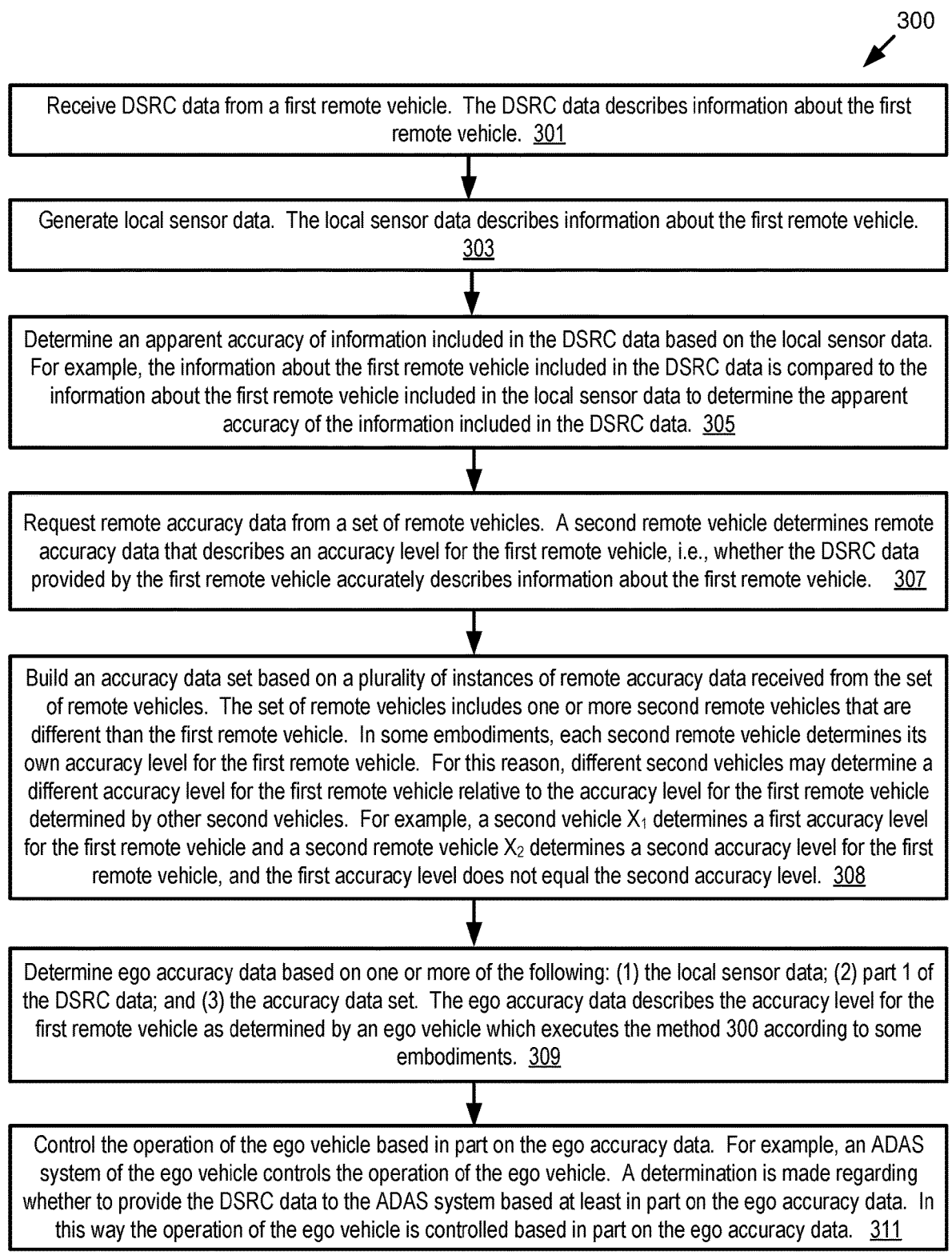
FIG. 3 is a flowchart of an example method for determining whether the DSRC data provided by a first remote vehicle is provided to an ADAS system of an ego vehicle according to some embodiments.

Referring now to FIG. 3, depicted is a flowchart of an example method 300 for determining whether the DSRC data provided by a first remote vehicle is provided to an ADAS system of an ego vehicle according to some embodiments. One or more of the steps described herein for the method 300 may be executed by one or more accuracy systems.

At step 301, DSRC data is received from a first remote vehicle. The DSRC data describes information about the first remote vehicle.

At step 303, local sensor data is generated. The local sensor data describes information about the first remote vehicle.

At step 305, an apparent accuracy of information included in the DSRC data based on the local sensor data. For example, the information about the first remote vehicle included in the DSRC data is compared to the information about the first remote vehicle included in the local sensor data to determine the apparent accuracy of the information included in the DSRC data. In some embodiments, the local sensor data may be assumed to be accurate because the states of the onboard sensors of the ego vehicle are known and assumed good. In some embodiments, the local sensor data is not assumed to be accurate, and step 305 identifies are variance between the DSRC data and the local sensor data. A variance occurs when the DSRC data is inconsistent with the local sensor data.

At step 307, remote accuracy data is requested from a set of remote vehicles. The set of remote vehicles includes one or more second remote vehicles. A second remote vehicle determines remote accuracy data that describes an accuracy level for the first remote vehicle, i.e., whether the DSRC data provided by the first remote vehicle accurately describes information about the first remote vehicle. Each second remote vehicle included in the set of remote vehicles provides its own instance of remote accuracy data describing the accuracy level for the first remote vehicle. In this way the ego vehicle receives a plurality of instances of remote accuracy data.

At step 308, an accuracy data set is built based on the plurality of instances of remote accuracy data received from the set of remote vehicles. The set of remote vehicles includes one or more second remote vehicles that are different than the first remote vehicle. In some embodiments, each second remote vehicles determines its own accuracy level for the first remote vehicle. For this reason, different second vehicles may determine a different accuracy level for the first remote vehicle relative to the accuracy level for the first remote vehicle determined by other second vehicles.

For example, a second vehicle $X_1$ determines a first accuracy level for the first remote vehicle and a second remote vehicle $X_2$ determines a second accuracy level for the first remote vehicle, and the first accuracy level does not equal the second accuracy level.

At step 309, ego accuracy data is determined based on one or more of the following: (1) the local sensor data; (2) part 1 of the DSRC data received from the first remote vehicle; and (3) the accuracy data set. The ego accuracy data describes the accuracy level for the first remote vehicle as determined by an ego vehicle which executes the method 300 according to some embodiments.

At step 311, the operation of the ego vehicle is controlled based in part on the ego accuracy data. For example, an ADAS system of the ego vehicle controls the operation of the ego vehicle. A determination is made regarding whether to provide the DSRC data to the ADAS system based at least in part on the ego accuracy data. In this way the operation of the ego vehicle is controlled based in part on the ego accuracy data.

In some embodiments, steps 303-311 are executed in real-time or substantially real-time relative to the receipt of the DSRC data at step 301. This is beneficial, for example, because it improves the performance of the ADAS system of the ego vehicle by ensuring that the ADAS system only considers accurate information when controlling the operation of the ego vehicle. This is particularly important if the ego vehicle is an automated or semi-automated vehicle such that lives may be lost based on the operation of the ADAS system.

Referring now to FIG. 4A, depicted is a block diagram illustrating an example of the DSRC data 195 according to some embodiments.

A DSRC message may be broadcasted or transmitted over the 5.9 GHz DSRC band. BSMs are broadcast whereas other DSRC messages are unicast. DSRC range may be substantially 1,000 meters. In some embodiments, DSRC range may include a range of substantially 100 meters to substantially 1,000 meters. The range is variable based on the presence of obstructions such as other cars, trees, hills and buildings. For example, the range of DSRC is greater in a rural setting with flat land than a city because of the presence of buildings are more cars in the city.

In some embodiments, the DSRC message is a BSM. The regular interval for transmitting BSMs may be user configurable. In some embodiments, a default setting for this interval may be transmitting the BSM every 0.10 seconds or substantially every 0.10 seconds.

Referring now to FIG. 4B, depicted is a block diagram illustrating an example of DSRC data 195 according to some embodiments.

A DSRC message may include two parts. These two parts may include different DSRC data 195 as shown in FIG. 4B.

Part 1 of the DSRC data 195 may describe one or more of the following: vehicle position; vehicle heading; vehicle speed; vehicle acceleration; vehicle steering wheel angle; and vehicle size.

Part 2 of the DSRC data 195 may include a variable set of data elements drawn from a list of optional elements. Some of the DSRC data 195 included in Part 2 of the BSM are selected based on event triggers, e.g., anti-locking brake system ("ABS") being activated may trigger DSRC data 195 relevant to the ABS system of the vehicle.

In some embodiments, some of the elements of Part 2 are transmitted less frequently in order to conserve bandwidth.

In some embodiments, the DSRC data 195 included in a DSRC message (e.g., a BSM) includes current snapshots of a vehicle traveling along a roadway system.

In some embodiments, the ego accuracy data 190 describes whether particular sensor measurements (e.g., location, speed, heading, etc.) included in the DSRC data 195 are accurate.

FIGS. 5-7 are block diagrams illustrating an example use case of the accuracy system according to some embodiments. The block labeled $X_0$ in FIGS. 5-7 is an example embodiment of the ego vehicle 123, the block labeled $X_5$ is an example embodiment of the first remote vehicle 124 and the blocks labeled $X_1$, $X_2$, $X_3$ and $X_4$ are examples of second remote vehicles that are included in the remote vehicle set 126. The accuracy system 199 of the ego vehicle 123 compares the ego accuracy data 190 to the threshold data to determine whether the predetermined threshold is satisfied, and in this way determines whether the DSRC data 195 for the first remote vehicle 124 will be provided as an input the ADAS system 180.

Each of $X_0$, $X_1$, $X_2$, $X_3$, $X_4$ and $X_5$ may be considered to be nodes. A node is usually a vehicle, but it can also be a device in the infrastructure such as an RSU. Nodes can communicate with each other via DSRC or some other wireless communication method.

Referring now to FIG. 5, depicted is a block diagram illustrating an example use case of the accuracy system according to some embodiments.

At block 501, the ego vehicle ($X_0$) receives DSRC data from the first remote vehicle ($X_5$). The DSRC data describes information about the first remote vehicle. An accuracy level for the first remote vehicle is not known by the ego vehicle because, for example, the ego vehicle has never received DSRC data from the first remote vehicle before. The accuracy system of the ego vehicle causes the sensor set of the ego vehicle to generate local sensor data that describes the first remote vehicle. The accuracy system of the ego vehicle compares the DSRC data to the local sensor data and identifies a variance between the DSRC data and the local sensor data. If multiple instances of DSRC data are received (e.g., because BSMs are broadcast every 0.10 seconds), then the multiple instances of DSRC data may be inconsistent with one another, which would also indicate a variance.

At block 502, the ego vehicle requests remote accuracy data from a plurality of second remote vehicles ($X_1$, $X_2$, $X_3$ and $X_4$) that describes the first remote vehicle.

At block 503, the ego vehicle receives wireless messages from the plurality of second remote vehicles that includes their remote accuracy data for the first remote vehicle. The accuracy system of the ego vehicle determines the ego accuracy data based in part on the remote accuracy data.

Example functions included in the accuracy system for determining the ego accuracy data is now described according to some embodiments. Some definitions for these functions include the following:

$X_i$: Node i. A node is usually a vehicle, but it can also be a device in the infrastructure such as an RSU.

$R_i$: Requesting flag for Node i.

$S_i$: Sending flag for Node i.

$P_{i,j}$: Accuracy level for Node i from Node j. This accuracy level can be for specific information, or applied generally to all information included in the DSRC data of a particular Node i.

T: Time to timeout.

In some embodiments, each node $X_0$ has two basic functions: (1) the request function; and (2) the provide function. The request function broadcasts a message for the accuracy level of $X_i$ (i.e., asks for remote accuracy data from other remote nodes such as the second remote vehicles). The provide function provides the ego accuracy data for $X_i$. If the ego accuracy data has been computed, $X_0$ directly broadcasts it; otherwise, $X_0$ calls the request function first and then broadcasts it.

The request function is now described.

---
Request ( $X_i$, T )
---
1  if ( $R_i$ == 0 )
2      $R_i$ = 1
3      Broadcast a request message for the accuracy level of $X_i$
4      while ( still before the timeout T )
5          Receive $P_{i,jk}$ from $X_{jk}$
6      Compute and update $P_{i,0}$
7      Update each $P_{jk,0}$
8      $R_i$ = 0
---

Lines 6 and 7 of the request function are now described in more detail according to some embodiments. Regarding line 6, assume $X_0$ receives N responses from $X_{j1}, X_{j2}, \ldots, X_{jN}$, where each $P_{jk,0}$ is positive (it does not count if $P_{jk,0}$ is non-positive), $P_{i,0} = (P_{i,j1} \times P_{j1,0} + P_{i,j2} \times P_{j2,0} + \ldots + P_{i,jN} \times P_{jN,0})/(P_{j1,0} + P_{j2,0} + \ldots + P_{jN,0})$. Regarding line 7, if $P_{i,0} \times P_{i,jk} < 0$, then $P_{jk,0} = \max(-1, P_{jk,0} - |P_{i,0} - P_{i,jk}|)$.

The provide function is now described.

---
Provide ( $X_i$, T )
---
1  if ( $P_{i,0}$ has been computed )
2      Broadcast $P_{i,0}$
3  else if ( T - Δ > 0 and $S_i$ == 0 )
4      $S_i$ = 1
5      Request ( $X_i$, T - Δ )
6      $S_i$ = 0
7      Broadcast $P_{i,0}$
---

Note that every node $X_0$ that includes an accuracy system can, according to some embodiments, execute the request and provide function since these functions are included in the software for the accuracy system according to some embodiments. Here, the index 0 of $P_{i,0}$ means "the node itself", not the node $X_0$ which executes the request function from the beginning. The overall process is a recursive method where a node executing the provide function may not have the trust information of $X_i$. In this case (after Line 3 in the provide function), it also calls the request function to ask for remote accuracy data from the other nodes.

In some embodiments, if the accuracy level $P_{i,0}$ is high (relative to the predetermined threshold), then the accuracy system for $X_0$ determines that the local sensor data is wrong and there is a potential sensor error for $X_0$. If the accuracy level $P_{i,0}$ is low, t then the accuracy system for $X_0$ determines that the DSRC data is wrong and there is a potential security attack.

In some embodiments, the analysis described above can be done in real-time or near real-time. The overhead comes from the communication between nodes. The least possible overhead, and the most near-real time scenario, occurs when the communication is between two nodes: one requests the accuracy level, and one provides the accuracy level. In other words, when there is only one second remote vehicle and not a plurality of second remote vehicle, then the functionality of the accuracy system of the ego vehicle occurs more near to real-time. More complicated situations depend on the variable "T," the time to timeout, which defines how long the node will wait for feedback from other nodes. There is a trade-off in these situations: a larger variable "T" collects more feedback, and a smaller variable "T" provides an earlier determination of the ego accuracy data by the accuracy system of the ego vehicle FIGS. 6 and 7 describe a specific example of the accuracy system where the ADAS system of the ego vehicle is a Cooperative Adaptive Cruise Control (CACC) system. FIG. 6 descries a first scenario and FIG. 7 describes a second example. The examples of FIGS. 6 and 7 are meant to be illustrative and not limiting as FIG. 5 describes a general example.

In FIGS. 6 and 7 there are two vehicles (in a generalized scenario, it can be a platoon of vehicles) where a first remote vehicle (denoted as $X_5$) is leading, and an ego vehicle (denoted as $X_0$) is following. The ego vehicle considers the acceleration, speed, and location of the first remote vehicle to decide its own target gap to the first remote vehicle, target velocity and target acceleration. The acceleration, velocity and location of the first remote vehicle are sent by the first remote vehicle and received by the ego vehicle which is following the first remote vehicle. This information is included in the DSRC data provided by the first remote vehicle to the ego vehicle via an DSRC message such as a BSM. The ego vehicle also senses the acceleration, speed, and location of the first remote vehicle by itself (e.g., generates local sensor data describing the first remote vehicle). Assuming that the DSRC data describes the velocity of the ego vehicle as 60 miles per hour and the local sensor data describes the velocity of the ego vehicle as 90 miles per hour, the accuracy system of the ego vehicle can determine whether to rely to provide the velocity information included in the DSRC data to the CACC system. FIGS. 6 and 7 are now described with the information included in this paragraph provided as context for FIGS. 6 and 7.

Referring now to FIG. 6, at block 601 the ego vehicle ($X_0$) receives DSRC data from the first remote vehicle ($X_5$). The DSRC data describes information about the first remote vehicle such as the velocity of the first remote vehicle. In this example, the DSRC data indicates that the velocity of the first remote vehicle is 60 miles per hour. An accuracy level for the first remote vehicle is not known by the ego vehicle because, for example, the ego vehicle has never received DSRC data from the first remote vehicle before. The accuracy system of the ego vehicle causes the sensor set of the ego vehicle to generate local sensor data that describes the first remote vehicle. In this example the local sensor data indicates that the velocity of the first remote vehicle is 90 miles per hour. The accuracy system of the ego vehicle compares the DSRC data to the local sensor data and identifies a variance between the DSRC data and the local sensor data.

At block 602, the ego vehicle requests remote accuracy data from a plurality of second remote vehicles ($X_1$, $X_2$, $X_3$ and $X_4$) that describes the first remote vehicle. This request may be by broadcast. For example, the ego vehicle broadcasts a request for the remote accuracy data.

At block 603, the ego vehicle receives wireless messages from the plurality of second remote vehicles that includes their remote accuracy data for the first remote vehicle. The accuracy system of the ego vehicle determines the ego accuracy data based in part on the remote accuracy data. Here, the remote accuracy data received is $P_{5,1}$, $P_{5,2}$, $P_{5,3}$, and $P_{5,4}$. $P_{5,1}$ is received from second remote vehicle $X_1$. $P_{5,2}$ is received from second remote vehicle $X_2$. $P_{5,3}$ is received from second remote vehicle $X_3$. $P_{5,4}$ is received from second remote vehicle $X_4$.

At block 604, the ego vehicle determines accuracy levels for the second remote vehicles, where: trust level $P_{1,0}$ corresponds to the accuracy level for $X_1$; trust level $P_{2,0}$ corresponds to the accuracy level for $X_2$; trust level $P_{3,0}$ corresponds to the accuracy level for $X_3$; and trust level $P_{4,0}$ corresponds to the accuracy level for $X_4$.

At block 605, the ego accuracy data for the first remote vehicle is determined as follows: N=4, j1=1, j2=2, j3=3, j4=4, and $P_{5,0}=(1\times1+1\times0.9+(-1)\times0.4+0.9\times1)/(1+0.9+0.4+1)=0.727$. The rule applied at block 605 is described above with reference to line 6 of the request function according to some embodiments.

At block 606, the accuracy level for $X_3$ is updated to $P_{3,0}=-1$. The rule applied at block 606 is described above with reference to line 7 of the request function according to some embodiments.

In this first scenario, the ego vehicle ($X_0$) can decide that the velocity information from the first remote vehicle ($X_5$) has a high accuracy level, so it is likely that a sensor of the ego vehicle is broken or inaccurate. Without the proposed approach, if the ego vehicle trusts its own local sensor data, there is a risk of an accident occurring. The accuracy system described herein eliminates this risk.

Referring now to FIG. 7, at block 701 the ego vehicle ($X_0$) receives DSRC data from the first remote vehicle ($X_5$). The DSRC data describes information about the first remote vehicle such as the velocity of the first remote vehicle. In this example, the DSRC data indicates that the velocity of the first remote vehicle is 60 miles per hour. An accuracy level for the first remote vehicle is not known by the ego vehicle because, for example, the ego vehicle has never received DSRC data from the first remote vehicle before. The accuracy system of the ego vehicle causes the sensor set of the ego vehicle to generate local sensor data that describes the first remote vehicle. In this example the local sensor data indicates that the velocity of the first remote vehicle is 90 miles per hour. The accuracy system of the ego vehicle compares the DSRC data to the local sensor data and identifies a variance between the DSRC data and the local sensor data.

At block 702, the ego vehicle requests remote accuracy data from a plurality of second remote vehicles ($X_1$, $X_2$, $X_3$ and $X_4$) that describes the first remote vehicle. This request may be by broadcast. For example, the ego vehicle broadcasts a request for the remote accuracy data.

At block 703, the ego vehicle receives wireless messages from the plurality of second remote vehicles that includes their remote accuracy data for the first remote vehicle. The accuracy system of the ego vehicle determines the ego accuracy data based in part on the remote accuracy data. Here, the remote accuracy data received is $P_{5,1}$, $P_{5,2}$, $P_{5,3}$, and $P_{5,4}$. $P_{5,1}$ is received from second remote vehicle $X_1$. $P_{5,2}$ is received from second remote vehicle $X_2$. $P_{5,3}$ is received from second remote vehicle $X_3$. $P_{5,4}$ is received from second remote vehicle $X_4$.

At block 704, the ego vehicle determines accuracy levels for the second remote vehicles, where: trust level $P_{1,0}$ corresponds to the accuracy level for $X_1$; trust level $P_{2,0}$ corresponds to the accuracy level for $X_2$; trust level $P_{3,0}$ corresponds to the accuracy level for $X_3$; and trust level $P_{4,0}$ corresponds to the accuracy level for $X_4$.

At block 705, the ego accuracy data for the first remote vehicle is determined as follows: N=4, j1=1, j2=2, j3=3, j4=4, and $P_{5,0}=((-1)\times1+(-1)\times0.9+(-0.9)\times0.4+(-1)\times1)/(1+0.5+0.5+1)=-0.970$. The rule applied at block 705 is described above with reference to line 6 of the request function according to some embodiments.

In this second scenario, the ego vehicle ($X_0$) can decide that the velocity information from the first remote vehicle ($X_5$) has a low accuracy level (because, e.g., the predetermined threshold is greater than −0.970, which does not satisfy the threshold which may be 0), so it is likely that a sensor of the first remote vehicle is broken or inaccurate. Without the functionality provided by the accuracy system, if the ego vehicle trusts the velocity information included in the DSRC data, there is a risk of an accident occurring because the gap between the first remote vehicle (i.e., the leading vehicle) and the ego vehicle (i.e., the vehicle that is following the first remote vehicle in this example) would be bigger because the DSRC data describes the speed of the first remote vehicle as being 60 miles per hour when it is more likely to be closer to 90 miles per hour as described by the local sensor data. The accuracy system described herein eliminates this risk.

In some embodiments, the predetermined threshold is 0 so that any accuracy level that is below 0 is determined by the accuracy system of the ego vehicle to be not sufficiently accurate. In some embodiments, an accuracy level of "1" is the best possible accuracy level, meaning the most accurate.

Referring to block 604 of FIG. 6 and block 704 of FIG. 7, there are numerous implementations for initializing the accuracy levels for the second remote vehicles so that blocks 604 and 704 can be performed. Three example implementations are now described.

As a first example implementation for initializing the accuracy levels for the second remote vehicles, during maintenance or inspection, sensors can be calibrated. After calibration, the accuracy level for a particular second remote vehicle can be set to 1 and registered in a cloud server which provides the accuracy level to the ego vehicle via the network 105. In this example, "1" is assumed to be a high trust level or the best possible trust level. Note that the cloud server and its corresponding devices can also be nodes in the operating environment 100. If there is no further update, then the accuracy system of the ego vehicle will automatically decrease the accuracy level for the particular second remote vehicle as time from the date of the maintenance or inspection event increases. In this way, the accuracy levels for a plurality of second remote vehicles can be automatically known and updated. One example routine applied by the accuracy system to automatically decrease the accuracy level is max(1−2t, 0), where t is the number of years from the last maintenance or inspection to current time. This routine can be executed once a year on some predetermined date (e.g., January 1 of each year).

As a second example implementation for initializing the accuracy levels for the second remote vehicles, there is a public key infrastructure that nodes such as the ego vehicle can utilize. If the initial security key exchanged is completed with a certificate authority, then the accuracy level of a node can be set to "1" at the certificate authority or the other nodes involved in the security key exchange. If there is no security key exchange, the trust level of a node can be set to 0 (or some other value that is not sufficiently accurate based on the predetermined threshold).

As a third example implementation for initializing the accuracy levels for the second remote vehicles, the first example and the second example described in the two preceding paragraphs are combined. Possible operations include one or more of an average, minimum and maximum of the two example implementations described above.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for an ego vehicle including an Advanced Driver Assistance System (ADAS system), the method comprising:
    receiving wireless data describing information about a first remote vehicle, wherein the wireless data describes a sensor measurement recorded by the first remote vehicle;
    determining that the wireless data is inconsistent with local sensor data measured by the ego vehicle;
    requesting remote accuracy data from a set of remote vehicles, wherein the remote accuracy data describes an accuracy of the sensor measurement of the first remote vehicle as determined by the set of remote vehicles;
    determining ego accuracy data for the first remote vehicle based on the remote accuracy data that is received from the set of remote vehicles, wherein the ego accuracy data describes an accuracy level for the first remote vehicle as determined by the ego vehicle; and
    determining whether to input the wireless data to the ADAS system based on the accuracy level described by the ego accuracy data so that inaccurate information is not inputted to the ADAS system and a performance of the ADAS system is improved.

2. The method of claim 1, wherein the wireless data is received via a broadcasted message.

3. The method of claim 1, wherein the wireless data is included in a basic safety message.

4. The method of claim 1, wherein the wireless data describes one or more of the following: a location of the first remote vehicle at a particular time; a velocity of the first remote vehicle at the particular time; and a heading of the first remote vehicle at the particular time.

5. The method of claim 1, wherein requesting the remote accuracy data includes broadcasting a message that includes a request for the remote accuracy data from one or more second remote vehicles that are included in the set of remote vehicles.

6. The method of claim 1, wherein one or more of the wireless data and the remote accuracy data are received in a wireless message that is provided by a Roadside Unit (RSU).

7. The method of claim 1 further comprising comparing the accuracy level to a threshold value to determine whether the threshold value is satisfied, wherein determining whether to input the wireless data to the ADAS system includes inputting the wireless data to the ADAS system when the threshold value is satisfied and not inputting the wireless data to the ADAS system when the threshold value is not satisfied.

8. The method of claim 1, wherein the ego vehicle is a Highly Autonomous Vehicle.

9. A system including an ego vehicle, the ego vehicle comprising:
    an ADAS system; and
    an onboard vehicle computer system that is communicatively coupled to the ADAS system, the onboard vehicle computer system including a non-transitory memory storing computer code which, when executed by the onboard vehicle computer system causes the onboard vehicle computer system to:
    receive wireless data describing information about a first remote vehicle, wherein the wireless data describes a sensor measurement recorded by the first remote vehicle;
    determine that the wireless data is inconsistent with local sensor data;
    request remote accuracy data from a set of remote vehicles, wherein the remote accuracy data describes an accuracy of the sensor measurement of the first remote vehicle;
    determine ego accuracy data for the first remote vehicle based on the remote accuracy data that is received from the set of remote vehicles, wherein the ego accuracy data describes an accuracy level for the first remote vehicle; and
    determine whether to input the wireless data to the ADAS system based on the accuracy level described by the ego accuracy data so that inaccurate information is not inputted to the ADAS system.

10. The system of claim 9, wherein the wireless data is included in a basic safety message that describes one or more of a timestamp describing a particular time, a location of the first remote vehicle, a velocity of the first remote vehicle, and a heading of the first remote vehicle.

11. The system of claim 9, wherein the wireless data describes one or more of the following: a location of the first remote vehicle at a particular time; a velocity of the first remote vehicle at the particular time; and a heading of the first remote vehicle at the particular time.

12. The system of claim 9, wherein requesting the remote accuracy data includes broadcasting a message that includes a request for the remote accuracy data from one or more second remote vehicles that are included in the set of remote vehicles.

13. The system of claim 9, wherein one or more of the wireless data and the remote accuracy data are received in a wireless message that is provided by a Roadside Unit (RSU).

14. The system of claim 9, wherein the local sensor data describes one or more of the following as measured by a sensor set of the ego vehicle that is communicatively coupled to the onboard vehicle computer system: a location of the first remote vehicle at a particular time; a velocity of the first remote vehicle at the particular time; and a heading of the first remote vehicle at the particular time.

15. The system of claim 9 wherein the non-transitory memory stores additional computer code that, when executed by the onboard vehicle computer system, causes the onboard vehicle computer system to compare the accuracy level to a threshold value to determine whether the threshold value is satisfied, wherein determining whether to input the wireless data to the ADAS system includes inputting the wireless data to the ADAS system when the threshold value is satisfied and not inputting the wireless data to the ADAS system when the threshold value is not satisfied.

16. The system of claim 9, wherein the ego vehicle is an autonomous vehicle.

17. A computer program product comprising a non-transitory memory of an onboard vehicle computer system of an ego vehicle storing computer-executable code that, when executed by a processor, causes the processor to:

receive wireless data describing information about a first remote vehicle, wherein the wireless data describes a sensor measurement recorded by the first remote vehicle;

determine that the wireless data is inconsistent with local sensor data;

request remote accuracy data from a set of remote vehicles, wherein the remote accuracy data describes an accuracy of the sensor measurement of the first remote vehicle;

determine ego accuracy data for the first remote vehicle based on the remote accuracy data that is received from the set of remote vehicles, wherein the ego accuracy data describes an accuracy level for the first remote vehicle; and determine whether to input the wireless data to an Advanced Driver Assistance System (ADAS system) based on the accuracy level described by the ego accuracy data so that inaccurate information is not inputted to the ADAS system.

18. The computer program product of claim 17, wherein the wireless data is included in a basic safety message that describes one or more of a timestamp describing a particular time, a location of the first remote vehicle, a velocity of the first remote vehicle, and a heading of the first remote vehicle.

19. The computer program product of claim 17, wherein requesting the remote accuracy data includes broadcasting a message that includes a request for the remote accuracy data from one or more second remote vehicles that are included in the set of remote vehicles.

20. The computer program product of claim 17, wherein one or more of the ego vehicle and the first remote vehicle is an autonomous vehicle.

\* \* \* \* \*